United States Patent
Sinyavskiy et al.

(10) Patent No.: US 11,951,629 B2
(45) Date of Patent: Apr. 9, 2024

(54) SYSTEMS, APPARATUSES, AND METHODS FOR COST EVALUATION AND MOTION PLANNING FOR ROBOTIC DEVICES

(71) Applicant: Brain Corporation, San Diego, CA (US)

(72) Inventors: Oleg Sinyavskiy, San Diego, CA (US); Mark Ma, San Diego, CA (US); Tiger Lin, San Diego, CA (US)

(73) Assignee: Brain Corporation, San Diego, CA (US)

( * ) Notice: Subject to any disclaimer, the term of this patent is extended or adjusted under 35 U.S.C. 154(b) by 351 days.

(21) Appl. No.: 17/490,356

(22) Filed: Sep. 30, 2021

(65) Prior Publication Data
US 2022/0016778 A1    Jan. 20, 2022

Related U.S. Application Data

(63) Continuation of application No. PCT/US2020/026320, filed on Apr. 2, 2020.

(60) Provisional application No. 62/827,961, filed on Apr. 2, 2019.

(51) Int. Cl.
*B25J 9/16* (2006.01)
*G01C 21/34* (2006.01)

(52) U.S. Cl.
CPC .......... *B25J 9/1666* (2013.01); *B25J 9/1671* (2013.01); *G01C 21/3453* (2013.01)

(58) Field of Classification Search
CPC .............. B25J 9/1666; B25J 9/1671; G01C 21/3453; G05D 1/0217
See application file for complete search history.

(56) References Cited

U.S. PATENT DOCUMENTS

| | | | |
|---|---|---|---|
| 8,380,652 B1* | 2/2013 | Francis, Jr. | B25J 9/1661 706/48 |
| 9,568,915 B1 | 2/2017 | Berntorp et al. | |
| 10,059,392 B1* | 8/2018 | Fay | B62D 57/032 |
| 2008/0009965 A1* | 1/2008 | Bruemmer | G05D 1/0088 701/23 |
| 2017/0168488 A1 | 6/2017 | Wierzynski et al. | |
| 2017/0291301 A1 | 10/2017 | Ibarz Gabardos et al. | |
| 2019/0080266 A1* | 3/2019 | Zhu | G01C 21/3407 |

OTHER PUBLICATIONS

International Search Report and Written Opinion dated Jun. 29, 2020 for PCT/US20/26320.

* cited by examiner

*Primary Examiner* — Khoi H Tran
*Assistant Examiner* — Nhi Q Bui
(74) *Attorney, Agent, or Firm* — Brain Corporation; Sidharth Kapoor

(57) ABSTRACT

Systems, apparatuses, and methods for cost evaluation and motion planning for robotic devices are disclosed herein. According to at least one non-limiting exemplary embodiment, a method for producing and evaluating a continuous and differentiable total cost as a function of all available motion commands is disclosed and may be utilized in conjunction with a gradient descent to determine a minimum cost motion command corresponding to an optimal motion for a robotic device to execute in accordance with a target trajectory and obstacle avoidance.

20 Claims, 22 Drawing Sheets

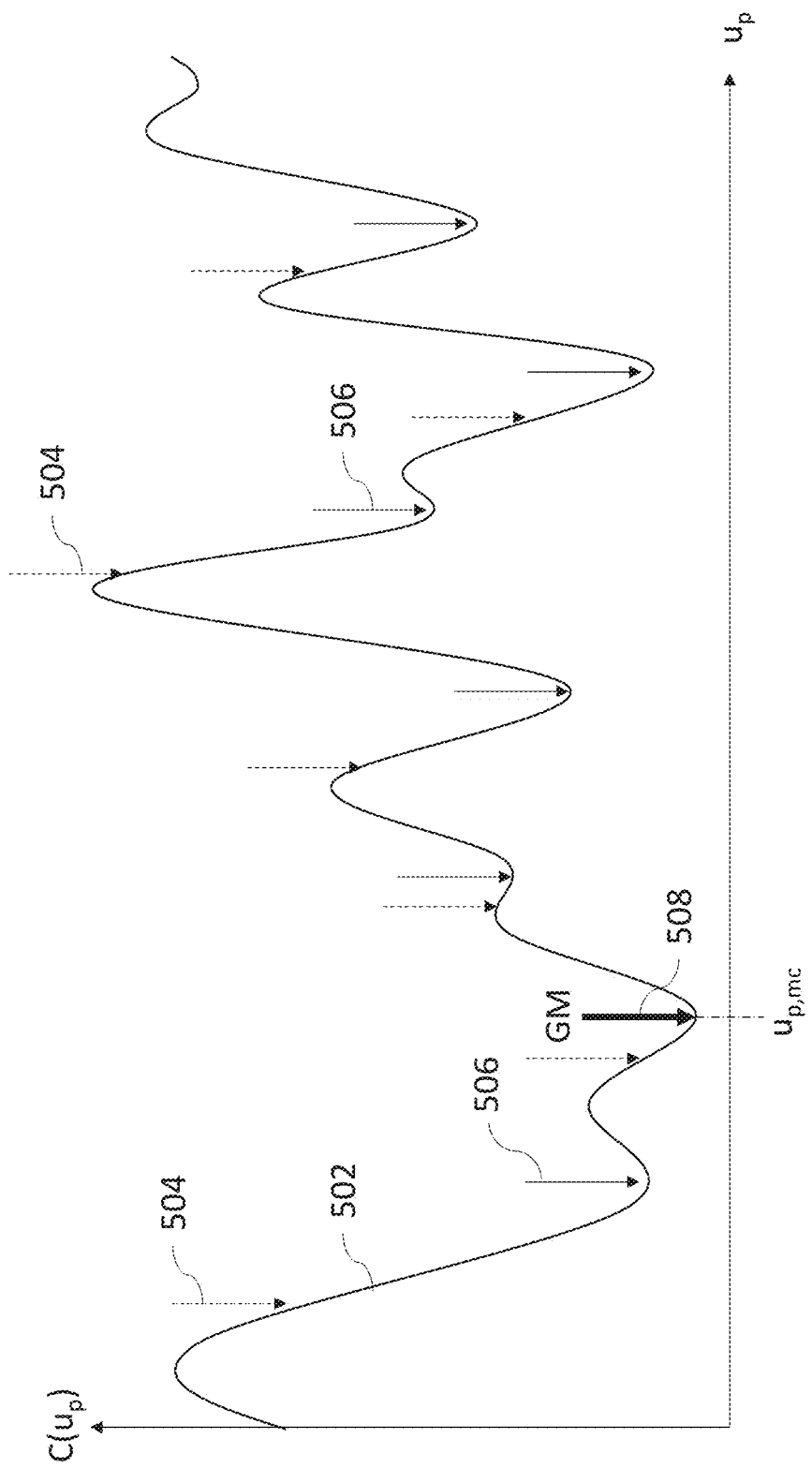

SYSTEMS, APPARATUSES, AND METHODS FOR COST EVALUATION AND MOTION PLANNING FOR ROBOTIC DEVICES

PRIORITY

This application is a continuation of International Patent Application No. PCT/US20/26320 filed Apr. 2, 2020 and claims the benefit of U.S. provisional patent application No. 62/827,961 filed Apr. 2, 2019, under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Background

Currently, many robots operate in two-dimensional space such as, for example, floor cleaning robots which operate on a floor or three-dimensional space, such as autonomous drones. These robots may be tasked with following a target trajectory optimally while avoiding obstacles. Real time calculation of a route for the robot to follow in accordance with the target trajectory may be computationally taxing on a controller of the robot especially in complex dynamic environments.

Many robots operate within dynamic environments, therefore requiring a robot to accurately and rapidly determine its optimal motion through the environments. Preprogrammed routes fail to adapt to dynamic changes within an environment such as moving objects, wherein robots may require some dynamic planning in order to avoid objects and obstacles to operate effectively. Robots may utilize cost evaluation to determine motions of minimal cost, wherein a high cost may correspond to a dangerous movement (i.e., close to objects, colliding with objects, etc.) and a low cost may correspond to optimal motion. Current cost evaluation and motion planning algorithms may, for example, become stuck at local minima and may be time consuming to execute thereby causing a robot to execute an acceptable motion rather than an optimal motion.

Accordingly, there is a need in the art for accurate cost evaluation of motion commands such that robots operating in complex environments may accurately navigate and determine optimal motion in real time by planning. Additionally, accurate cost map evaluation of motion commands by autonomous robots may further reduce reliance on humans as the accurate cost map evaluation may enhance navigation capabilities and autonomy by reducing collisions with objects and reduce a probability of a robot becoming stuck.

SUMMARY

The foregoing needs are satisfied by the present disclosure, which provides for, inter alia, systems, apparatuses, and methods for cost evaluation and motion planning for robotic devices.

Exemplary embodiments described herein have innovative features, no single one of which is indispensable or solely responsible for their desirable attributes. Without limiting the scope of the claims, some of the advantageous features will now be summarized. The present application relates generally to robotics, and more specifically to systems, apparatuses, and methods for cost evaluation and motion planning for robotic devices According to at least one non-limiting exemplary embodiment, a method for navigating a robotic device along a target trajectory is disclosed. The method may comprise evaluating a current state of the robotic device and environmental context, evaluating a total cost as a function of all available motion commands based on the current state and the environmental context, determining a minimum cost motion command based on the total cost function, and executing the minimum cost motion command to effectuate movement of the robotic device along the target trajectory. The method may further comprise evaluating the total cost function based on a control cost and an environmental cost for the all available motion commands. The method may further comprise generating a kernelized footprint of the robotic device comprising a continuous differentiable function and utilizing the kernelized footprint to generate a continuous differentiable environmental cost as a function of the all available motion commands based on an area overlap between the kernelized footprint and environmental objects projected on a computer readable map during execution of the all available motion commands. The method may further comprise utilizing at least one randomly selected precomputed motion primitive as at least one initial value on the total cost function, performing a gradient descent on the total cost function beginning at the at least one initial value, and determining a minimum cost motion command based on the determined minimum of the total cost function. The method may further comprise use of a collision threshold such that minimum cost motion commands exceeding the threshold may correspond to no viable paths being available to the robotic device without collision with objects in a surrounding environment. The evaluation of the minimum cost motion command may be performed during execution of a current motion command, the current motion command being determined to comprise a minimum cost motion command during a previous time step. Additionally, the all-available motion commands may comprise a continuous range of motion commands executable from a position of the robotic device upon completion of the current motion command. The method may further comprise utilizing a forward model of the robotic device to determine a plurality of sequential minimum cost motion commands for the robotic device to execute in accordance with the target trajectory. Lastly, the method may further comprise performing updates on portions of the sequence based on new environmental context data being received by one or more sensor units.

One skilled in the art would appreciate that the foregoing embodiments are non-limiting.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5B illustrates a controller of a robot performing a gradient descent on a cost function $C(u_p)$ to determine a minimum cost motion command, according to an exemplary embodiment.

Figure 1A:
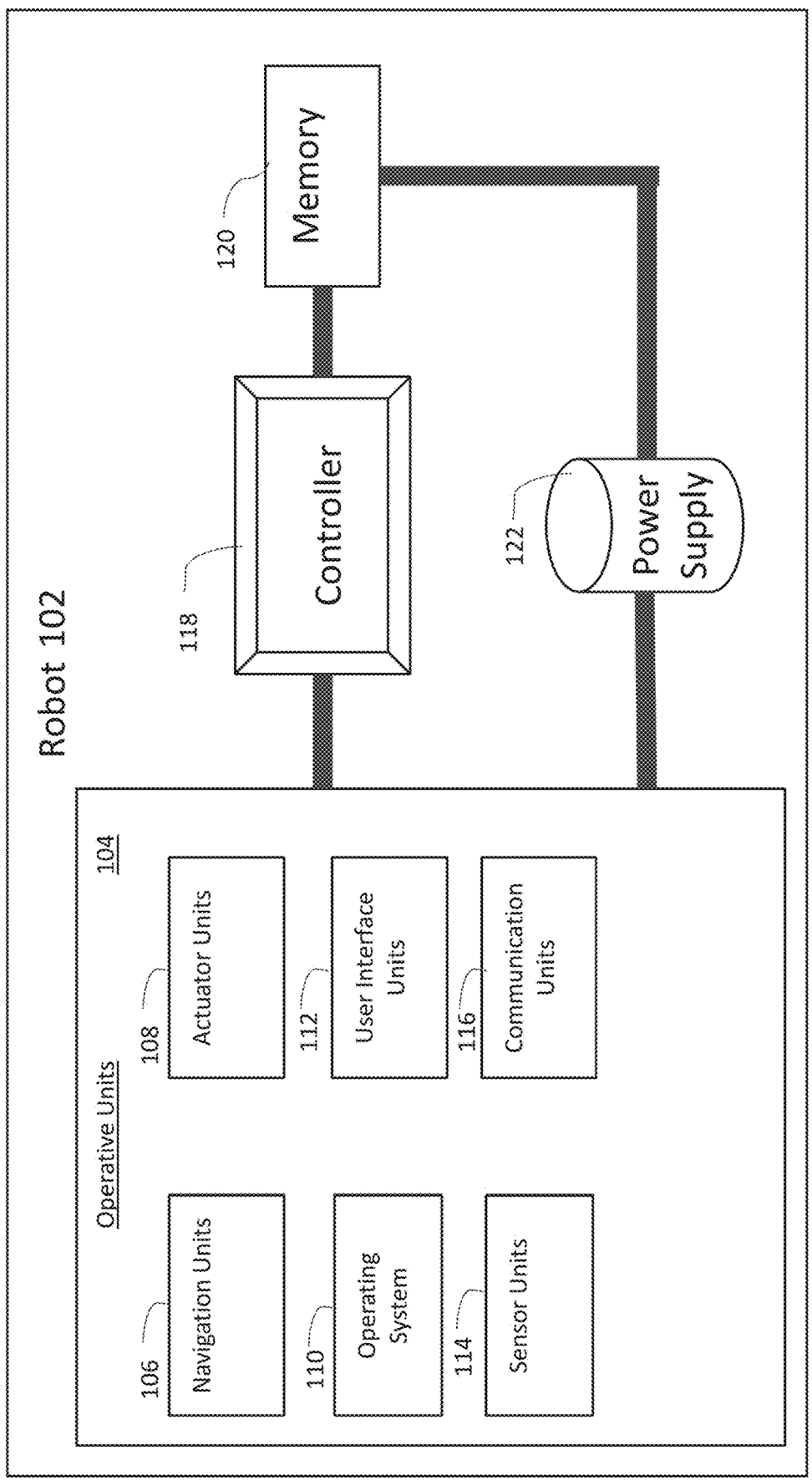
FIG. 1A is a functional block diagram of a main robot in accordance with some embodiments of this disclosure.

All Figures disclosed herein are © Copyright 2020 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for cost evaluation and motion planning for robotic devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a time step may encompass a period of time required for an algorithm to execute or a duration in time of which an executed command lasts. For example, a robot programed to execute motion commands lasting three (3) seconds may determine or execute subsequent motion commands with a time step of three (3) seconds.

As used herein, environmental data context may comprise any data detectable by a sensor unit of a robot. Environmental context data may include, but is not limited to, localization of objects, features of objects (e.g., color, shape, etc.), distance from objects, temperature of objects, and so forth.

As used herein, a kernelized footprint of a robot may correspond to a representation of the footprint of the robot using one or more continuous and differentiable functions. Footprints, as used herein, may correspond to a projection of a volume occupied by a robot projected onto a 2-dimensional plane. For example, a footprint of a robot which operates on a floor may correspond to floorspace occupied by a robot as viewed from above, wherein the footprint may correspond to area of a floor beneath the robot. An exemplary kernelized footprint is shown and described below with respect to FIG. 4C.

As used herein, network interfaces may include any signal, data, or software interface with a component, network, or process including, without limitation, those of the FireWire (e.g., FW400, FW800, FWS800T, FWS1600, FWS2420, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coax-sys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine-cognizable steps that perform a function. Such computer program and/or software may be rendered in any programming language or environment including, for example, C/C++, C #, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enhance navigation accuracy of a robotic device in accordance with a target trajectory; (ii) improve user interaction with robots by navigating the robots in smooth paths; (iii) improve an ability of a robot to react to a dynamic environment and plan its trajectory accordingly; and (iv) improve autonomy of robots by reducing reliance on human operators. Other advantages are readily discernable by one having ordinary skill in the art given the contents of the present disclosure.

According to at least one non-limiting exemplary embodiment, a method for navigating a robotic device along a target trajectory is disclosed. The method may comprise evaluating a current state of the robotic device and environmental context, evaluating a total cost as a function of all available motion commands based on the current state and the environmental context, determining a minimum cost motion command based on the total cost function, and executing the minimum cost motion command to effectuate movement of the robotic device along the target trajectory. The method may further comprise evaluating the total cost function based on a control cost and an environmental cost for the all available motion commands. The method may further comprise generating a kernelized footprint of the robotic device comprising a continuous differentiable function and utilizing the kernelized footprint to generate a continuous differentiable environmental cost as a function of the all available motion commands based on an area overlap between the kernelized footprint and environmental objects projected on a computer readable map during execution of the all available motion commands.

According to at least one non-limiting exemplary embodiment, the method may further comprise utilizing at least one randomly selected precomputed motion primitive as at least one initial value on the total cost function, performing a gradient descent on the total cost function beginning at least one initial value, and determining a minimum cost motion command based on the determined minimum of the total cost function. The method may further comprise use of a collision threshold such that minimum cost motion commands exceeding the threshold may correspond to no viable paths being available to the robotic device without collision with objects in a surrounding environment. The evaluation of the minimum cost motion command may be performed during execution of a current motion command, the current motion command being determined to comprise a minimum cost motion command during a previous time step. Additionally, the all-available motion commands may comprise a continuous range of motion commands executable from a position of the robotic device upon completion of the current motion command. The method may further comprise utilizing a forward model of the robotic device to determine a plurality of sequential minimum cost motion commands for the robotic device to execute in accordance with the target trajectory. Lastly, the method may further comprise performing updates on portions of the sequence based on new environmental context data being received by one or more sensor units.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Peripherals may include hardware configured to accelerate or perform a specific task such as multipliers, encryption/decryption hardware, arithmetic logic units ("ALU"), digital to analog converters, analog to digital converters, multiplexers/demultiplexers, and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments, different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments, user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer readable instructions stored on a non-transitory computer readable storage apparatus, such as memory 120, as would be appreciated by one skilled in the art.

Figure 1B:
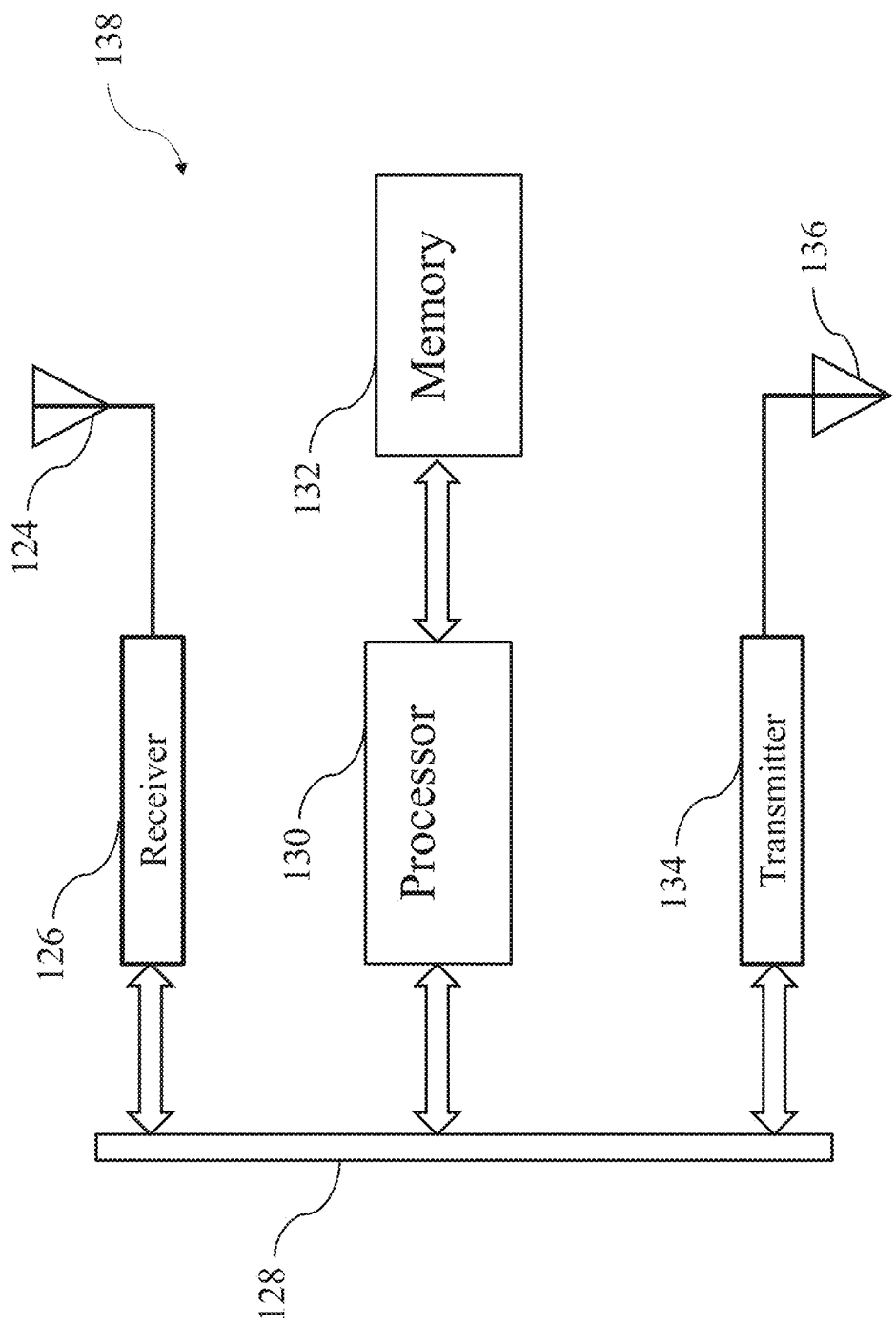
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

Figure 2A:
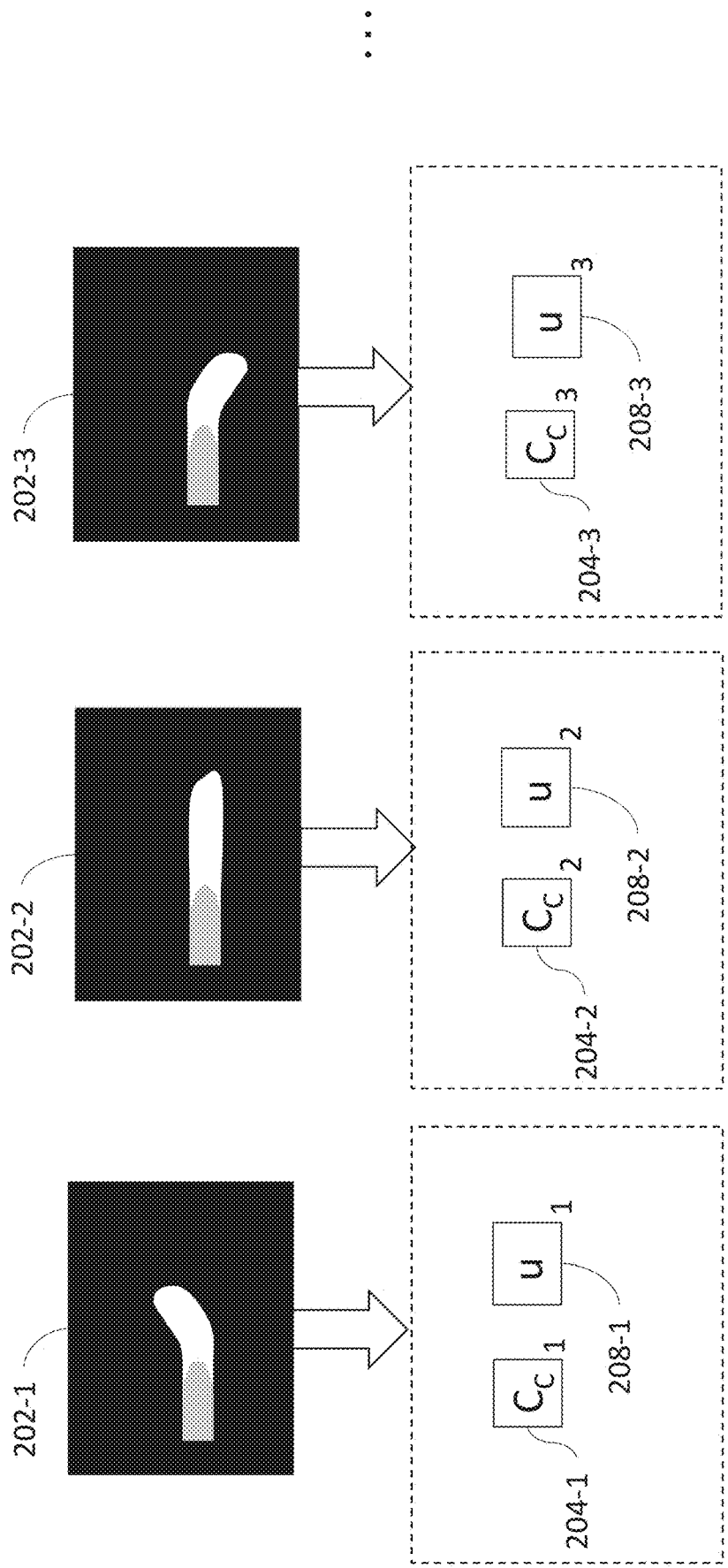
FIG. 2A illustrates three motion commands, of a plurality of available motion commands, and their associated control cost in accordance with some embodiments of this disclosure.

FIG. 2A illustrates three motion commands 202 and their corresponding control cost 204 $C_C$, and control commands 208 U in accordance with some exemplary embodiments of the present disclosure. A motion command 202 may comprise a movement for a robot 102 to execute from an initial state, the movement lasting a predetermined duration in time. Regions shaded in white or grey illustrate regions where footprints of the robot 102 are observed as the robot 102 executes a corresponding control command 208 U associated with a motion command 202, wherein a footprint of a robot 102 comprises a spatial projection of a region occupied by the robot 102 projected onto a two-dimensional plane. A plurality of motion commands 202 may be precomputed and stored in a non-transitory computer readable storage medium either on a robot 102 or on an external server communicatively coupled to the robot 102. The motion commands 202 may comprise a discrete set of motions of which the robot 102 may execute (e.g., turn left 90°, 85°, 80°, etc.) which are stored in the storage medium. As used herein, any motion command 202 which lasts a predetermined amount of time or includes the robot 102 moving a predetermined distance may be referred to as a motion primitive. Motion primitives may include control costs 204 defined by a function of robot parameters (e.g., $(x(t), y(t), \theta(t))$) or precomputed values.

A robot 102 may determine which motion command 202 to execute based on an initial state of the robot 102 and an associated cost (e.g., control cost 204 and other costs illustrated in FIG. 2B-D below) for executing the motion command 202, wherein the executed motion command 202 comprises a minimum cost motion command. The initial state may comprise a position of the robot 102 (e.g., (x, y, θ) pose as viewed from above) and/or a state of any features of the robot 102 (e.g., a gripper arm of the robot 102 being extended or retracted) which may alter a footprint of the robot 102. The robot 102 may utilize an egocentric coordinate system, wherein the robot 102 always faces forwards (e.g., along a positive x direction) and remains at an origin of the egocentric coordinate system such that a surrounding environment moves about the robot 102 as the robot 102 moves. Based on its current state, a plurality of costs corresponding to a plurality of possible motion commands 202 may be evaluated to determine motion of the robot 102 along a target trajectory.

For example, motion command 202-1 comprises an initial state of a robot 102, shaded in grey, and a movement for the robot 102 upon execution of a control command 208-1 $u_1$, shaded in white. Motion command 202-1 may further comprise an associated control cost 204-1 $C_{c1}$, wherein calculations of values of the control cost 204-1 is illustrated below in FIG. 2B. Additionally, an environmental cost 232 $C_E$ may be evaluated based on an evaluation of a surrounding environment, as further illustrated below in FIGS. 2D and 4A-F.

As used herein, execution of a motion command 202 by a robot 102 may comprise execution of an associated control command 208, $u_p$, of the motion command 202. Control command 208 includes one or more one or more control parameters (e.g., (v, ω) or velocity and angular rotation rate). The control parameters used may depend on the means of locomotion of the robot 102 (e.g., (v, ω) for differential drive robots; (v, α) for tricycle robots, α being a front wheel turning angle; and so forth for other locomotion configurations).

Figure 2B:
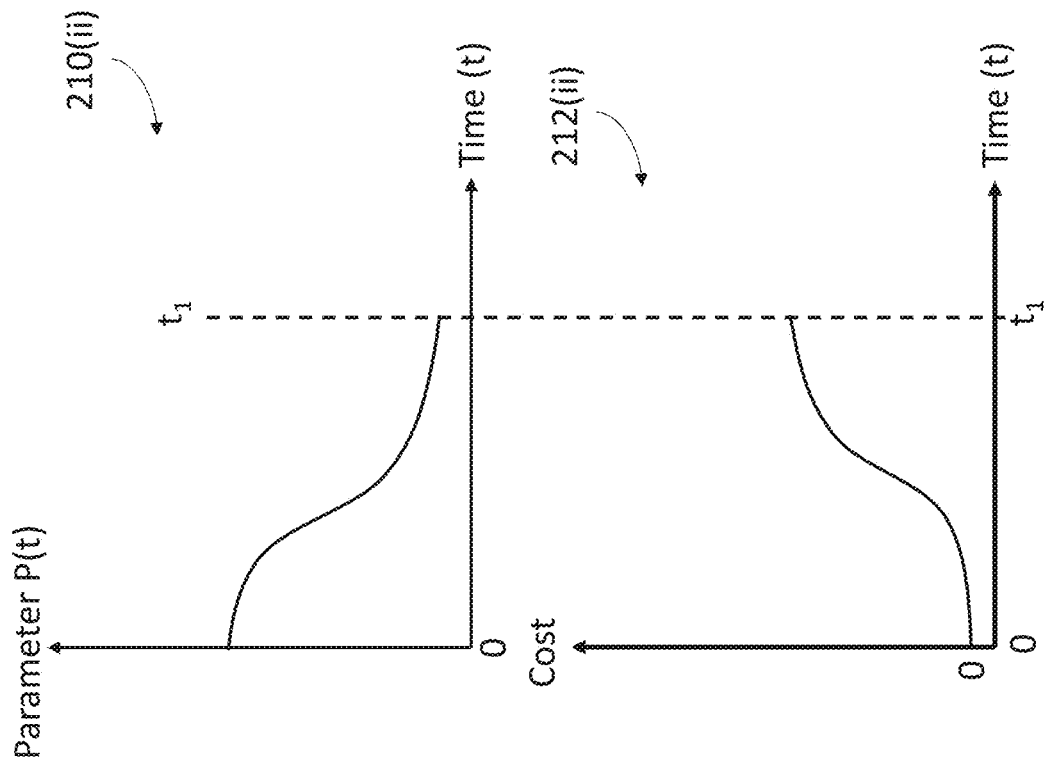
FIG. 2B(i)-(ii) illustrates evaluation of a control cost associated with a motion command, according to an exemplary embodiment.
Figure 2B:
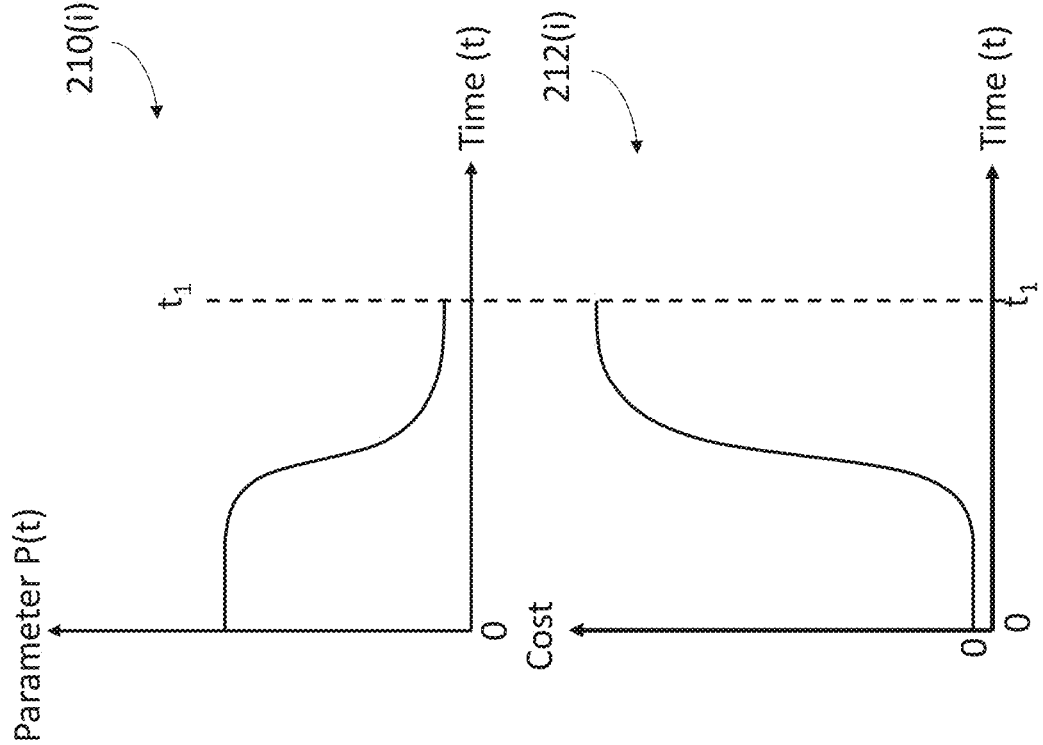

FIG. 2B illustrates a graph 210 of a control parameter of a robot 102 over time and an associated cost graph 212 of the control parameter (e.g., $C_c$) to illustrate how a control cost 204 of an associated motion command 202 are calculated in accordance with some exemplary embodiments of the present disclosure. Graph 210 may be a graph of a control parameter of a robot 102 such as a steering angle of one or more wheels, velocity (e.g., angular or linear velocity) of the robot 102, acceleration, or any similar control or state-space parameter of the robot 102 measured over time. The control parameters further may include a x, y, or θ position parameter of the robot 102 on a two-dimensional map of an environment. In some embodiments, control parameters may further include z, pitch, and roll parameters on a three-dimensional map. A control cost 204 may be associated with a motion command 202 based on a rate of change of the control or state parameter, illustrated by a derivative of graph 210. For example, cost graph 212 may be calculated based on a magnitude of the derivative measure of an associated parameter graph 210 of a control parameter (e.g., θ orientation, steering shaft angle, translational velocity v, etc.), P, over a fixed time period oft seconds following equation 1 below:

$$\text{Cost } \alpha \left| \frac{dP}{dt} \right| \quad \text{(Eqn. 1)}$$

Wherein, the motion command 202 of which the cost graph 212 is being evaluated for lasts $t_1$ seconds. The term Cost in the above equation may correspond to a control cost 204 and is proportional to a time rate change of the parameter P over the fixed time period of $t_1$ seconds. Accordingly, high costs are associated with rapidly changing control parameters to encourage the robot 102 to execute smooth movements. In some embodiments, the control costs 204 may be proportional to the square, or higher exponential, of the time derivative of the control or state parameter. Advantageously, setting the control cost 204 proportional to the time rate change of the control parameter P encourages the robot 102 to favor smooth motions as rapidly changing control or state parameters (e.g., a rapidly changing steering shaft, rapidly changing acceleration or large jerk) are penalized with high costs.

Figure 2C:
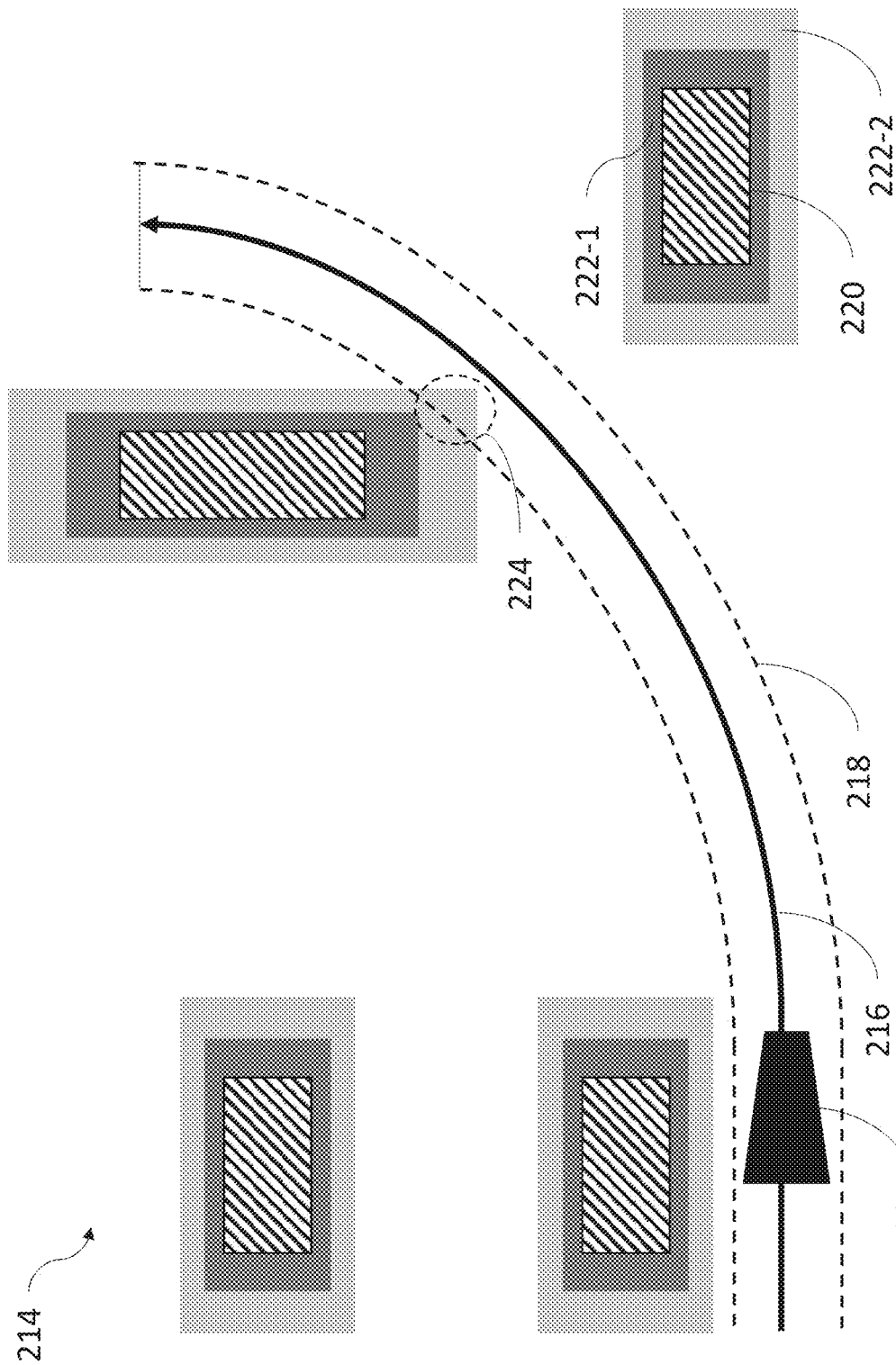
FIG. 2C illustrates a robot navigating along a target trajectory using motion commands based on a cost evaluation to determine its motion along the target trajectory, according to an exemplary embodiment.

Next, FIG. 2C illustrates a two-dimensional ("2D") computer readable map 214 of an environment surrounding a robot 102 from a top-view, the environment comprising a plurality of obstacles 220 and a route 216 for the robot 102 to follow, according to an exemplary embodiment. The robot 102 may desire to move along route 216 while minimizing costs associated with executing control commands 208 of motion commands 202. The robot 102 may be rewarded for following the route 216 within boundaries 218, wherein the reward may comprise a negative cost associated with following the route 216 within the boundaries 218. Boundaries 218 may be set based on a size of a footprint of the robot 102 such that the boundaries comprise roughly the size of the footprint of the robot 102 positioned symmetrically on both sides of the route 216 as the robot 102 footprint is symmetric. According to at least one non-limiting exemplary embodiment, the boundaries 218 may be positioned asymmetrically with respect to the route 216 if a footprint of the robot 102 is asymmetrical.

Additionally, computer readable map 214 may further comprise a plurality of obstacles 220, wherein each obstacle 220 comprises a stationary object surrounded by risk zones 222. Each risk zone 222 may comprise a corresponding cost for the robot 102 navigating within the risk zone 222, wherein the corresponding cost may comprise a high cost for navigating nearby the object 218 (e.g., risk zone 222-1) and a lower cost for navigating farther away from the object 218 (e.g., risk zone 222-2). According to at least one non-limiting exemplary embodiment, a risk zone 222 surrounding an object 218 may comprise a continuous decaying cost function instead of discretized risk zones 222-1, 220-2, etc. The robot 102 may execute a plurality of motion commands 202 sequentially to effectuate movement along a target trajectory 216, wherein the motion commands 202 executed are of minimum total cost as to encourage the robot 102 to follow the target trajectory 216 within boundaries 218 and avoid risk zones 222 of nearby obstacles 220.

Additionally, a region 224 may comprise a risk zone 222-2 overlapping in part with boundaries 218, wherein the controller 118 of the robot 102 may determine to follow the route 216 exactly or deviate slightly therefrom to minimize cost. The controller 118 may compare a first cost of a first motion command 202 $u_1$ associated with navigating within boundaries 218 and through the region 224 and a second cost of a second motion command 202 $u_2$ associated with navigating slightly outside boundaries 218 and avoiding the region 224. The first and second costs may be determined based on control costs 204 $C_C$ and environmental costs $C_E$. The environmental costs may be calculated using an operation 228, illustrated below in FIG. 2D, which is based on the environment and a current state of the robot 102 therein. It is further appreciated that a third motion command 202 comprising some deviation from the trajectory 216 and some navigation through zone 224 may comprise a lower cost than the first or second costs, wherein the motion command 202 comprising the lowest cost of the three will be executed.

Computer readable map 214 may comprise of a plurality of pixels, each pixel representing a region in space. For example, each pixel may correspond to a 3×3 inch space of an environment of the robot 102. The computer readable map 214 may be stored as an array or matrix in memory 120 of the robot 102, wherein each pixel of the computer readable map 214 may be represented by a value of the array or matrix with an associated cost or cost weight. For example, pixels representing objects 220 may include a high cost (e.g., 2000), pixels representing free space (illustrated in white) may comprise a low cost (e.g., 10), and pixels within boundaries 218 may comprise a substantially low, zero, or negative cost.

Figure 2D:
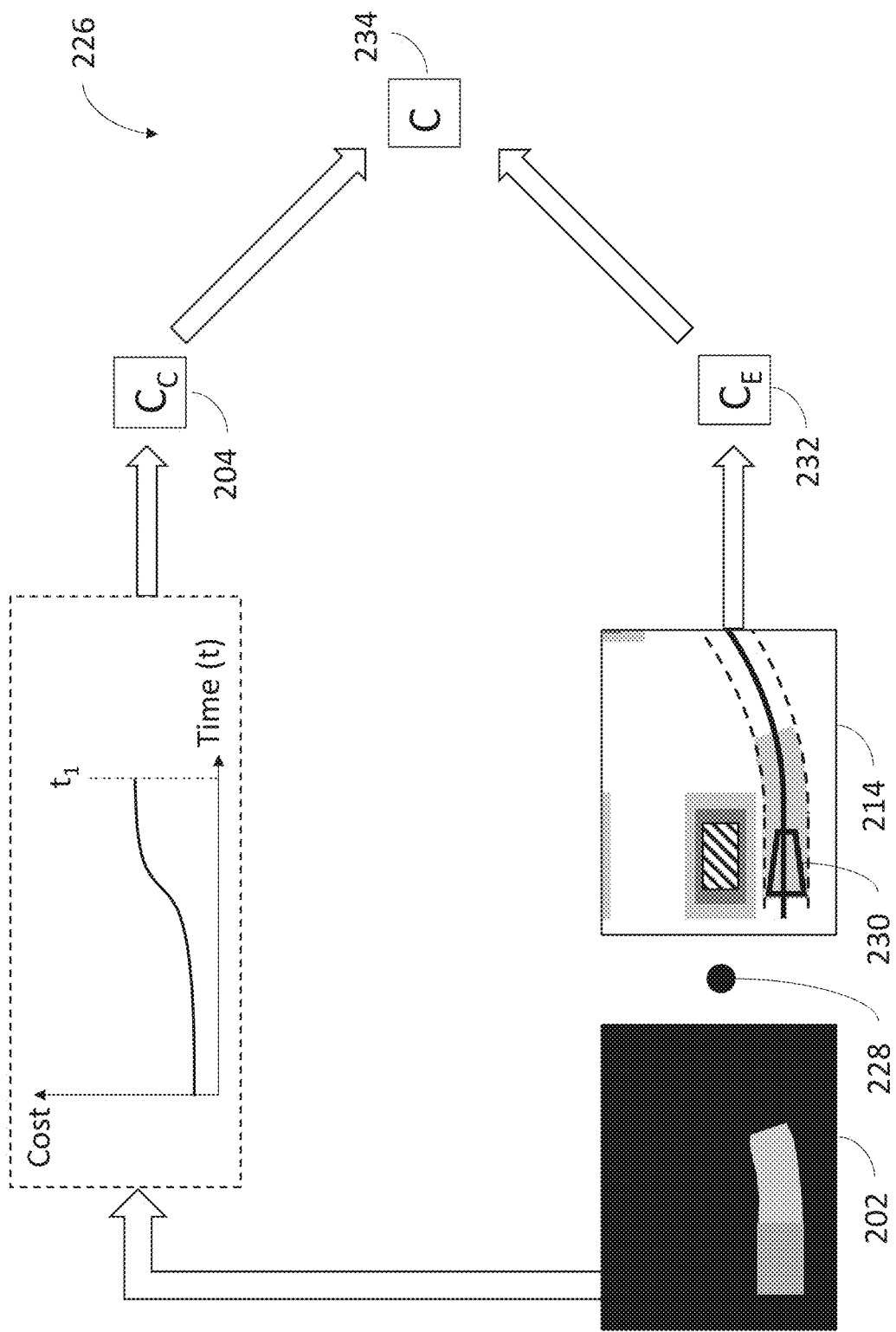
FIG. 2D is a block diagram illustrating a system configured to determine a total cost of a motion command based on control, state, and environmental costs, according to an exemplary embodiment.

FIG. 2D illustrates a block diagram of a system 226 configured to determine a total cost 234 of a motion command 202, according to an exemplary embodiment. The total cost 234 C may comprise a summation of a control cost 204 $C_C$ and an environment cost 232 $C_E$. The motion command 202 illustrated may comprise an arbitrary motion command 202 and is not intended to be limiting. The motion command 202 illustrated may comprise a motion for a robot 102 to execute lasting $t_1$ seconds. Accordingly, control cost 204 $C_C$ may be evaluated at time $t_1$ as similarly illustrated above in FIG. 2C.

The environmental cost 232 $C_E$ may be calculated by cropping a portion of an environment map 214 such that the motion command 202 and map 214 are of the same size (e.g., X by Y pixels), and calculating environmental costs 232 associated with executing the motion command 202. The environmental costs 232 may include costs for navigating nearby objects, rewards (i.e., negative costs) for navigating along a route closely, and any additional costs associated with navigating within the environment (e.g., rewards for navigating towards a target object). The calculation of the environmental cost 232 may be based on operation 228 comprising a dot product or convolution between the motion command 202 and a cropped portion of the map 214. The operation 228 is further discussed below with respect to FIG. 4A-F. In other words, environmental cost 232 $C_E$ may be determined by superimposing a motion command 202 (i.e., white and grey portions) within a portion of an environment on a map 214 and determining rewards for navigating along a route 216 closely and costs for navigating nearby or over obstacles 220 (e.g., an area convolution as illustrated in FIG. 4B below). This is illustrated by a grey region of map 214 which corresponds with the motion of the motion command 202 which, as shown, follows the route.

The two costs illustrated 204, 232 (i.e., $C_c$ and $C_E$) may then be summed to determine a total cost 234 C of the motion command 202. According to at least one non-limiting exemplary embodiment, a total cost 234 may comprise a weighted summation. A controller 118 of the robot 102 may then determine a minimum cost motion command from all available motion commands 202 to execute using systems and methods illustrated in FIG. 3-5 below.

Figure 3:
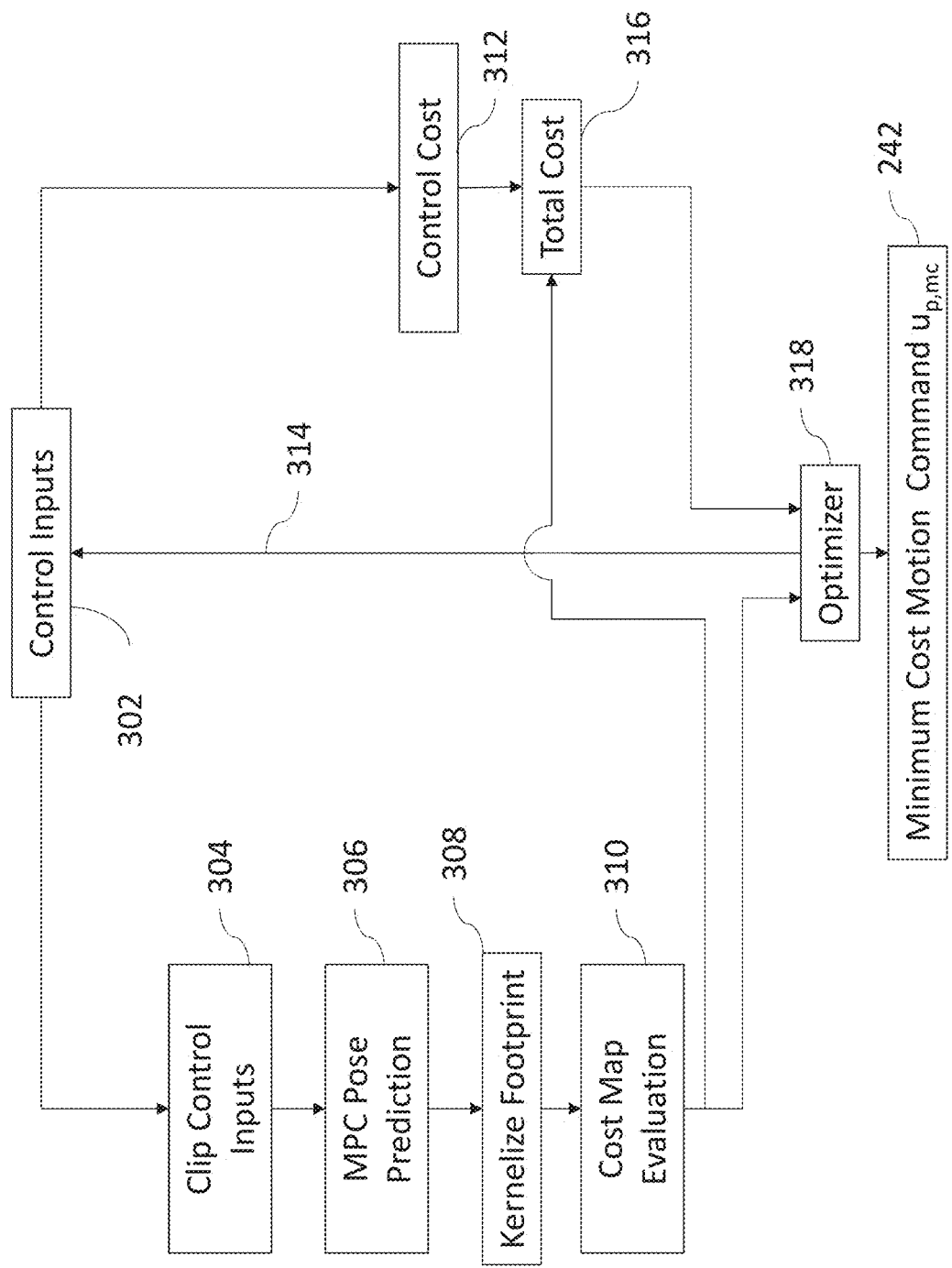
FIG. 3 is a functional block diagram of a system configured to determine a minimum cost motion command to effectuate movement of a robot, according to an exemplary embodiment.

FIG. 3 is a functional block diagram of a system configured to determine a minimum cost motion command 242 $u_p$,mc to execute at a subsequent time step p in real time, according to an exemplary embodiment. The system may receive control inputs 302 comprising a sequence of control commands 208 starting with a current control command $u_{p-1}$, $u_p$, $u_{p+1}$, $u_{p+2}$, etc. For example, the control inputs 302 may comprise a sequence of control commands 208, each control command 208 of the sequence comprising a translational velocity v of the robot 102 and a rotation rate w for the robot 102 to execute for a predetermined time period $t_1$. Executing the sequence of control commands 208 may configure the robot 102 to follow a route. The control inputs 302 may include a sequence of motion commands [$u_{p-1}$, $u_p$, $u_{p+1}$ ... $u_N$] starting from the current motion command $u_{p-1}$ 208 to $u_N$, wherein N is an integer number. The control inputs 302 may be sent to block 304 wherein relevant parameters of the control inputs 302 are clipped or bounded. The control inputs 302 may be clipped to be within reasonable bounds. For example, the translational velocity v may not exceed a threshold value equal to a maximum speed of the robot 102. As another example, rotation rate w may not exceed a maximum value equal to a turning rate of the robot 102. Other constraints may be envisioned by one skilled in the art to ensure control inputs 302 considered for cost evaluation are within reasonable bounds.

The clipped control inputs are passed to a model predictive control (MPC) pose prediction block 306 configured to utilize a forward model (e.g., kinematic equations) to predict a future pose of the robot 102 upon completion of a given motion command. One skilled in the art may appreciate that reference to block herein may represent hardware or software components that interact with other components coupled to the robot 102 to accomplish functioning of the robot 102 to perform a given task. The forward model may include a kinematic model of the robot 102 which describe movement of the robot 102 in response to one or more actuator signals provided by the control inputs 302. The MPC pose prediction block 306 may be configured to determine regions occupied by a footprint of the robot 102 during execution of the future motion commands $u_{p-1}$ to $u_N$ from a starting pose. For example, given a starting (x, y, θ) pose of a robot 102 and a control command 208 (v, ω) of the control inputs 302, the MPC pose prediction block 306 may calculate a final pose of the robot 102 after execution of the control command 208. One skilled in the art may appreciate that a final pose of the robot 102 upon executing a determined minimum cost motion command $u_{p-1,mc}$ may be determined by the MPC pose prediction block 306 and utilized as an initial pose for a subsequent minimum cost motion command evaluation (i.e., a pose from which the range of future motion commands $u_p$ of the subsequent motion evaluation are evaluated from). The MPC pose prediction block may additionally calculate a motion and poses of the robot 102 upon executing up to N motion commands ahead of the motion command $u_{p-1,mc}$ being executed.

Block 308 comprises kernelizing a footprint of the robot 102 such that the kernelized footprint of the robot 102 may be defined using a continuous and differentiable function, as described below in FIGS. 4A-4C. The kernelized footprint and MPC pose prediction output may be utilized by a block 310 for a cost map evaluation, wherein environmental cost values 232 for each motion command at the future pose of the robot 102 are evaluated. According to at least one non-limiting exemplary embodiment, kernelizing a footprint of the robot 102 may further include simplification of a function which defines the footprint (i.e., down sampling).

The environmental cost evaluation may comprise evaluation of a continuous motion of the robot 102 from the future pose at time step p, wherein the continuous motion is determined by the MPC pose prediction block 306 based on one or more provided control inputs 302. Output from the cost map evaluation block 310 may comprise an environmental cost 232 $C_E$, evaluated using methods illustrated in FIG. 4A-F below, as a function of the future motion commands $u_p$ and passed to both an optimizer 318 and a total cost block 316. The total cost block 316 may receive additional input from block 312 comprising the control costs 204 $C_C$ associated with the control inputs 302, wherein the control costs 204 are based on a time rate of change of control parameters during execution of the future motion commands $u_p$ to $u_N$. The determined total cost 234 is then passed to an optimizer 318 configured to minimize a total cost 316. Stated differently, optimizer 318 uses and incorporates data from each and every step illustrated in FIG. 3 in order to determine a minimum cost motion command 242 $u_{p,mc}$ of all motion primitives 202 within a library 240. This is further illustrated below in FIG. 4E. The optimizer 318 may modify one or more of the control inputs 302, wherein the total cost 316 may be calculated for the modified one or more control inputs 302 thereby creating a feedback loop configurable to determine a sequence of minimum cost motion commands $u_{p,mc}$, $u_{p+1,mc}$, $u_{p+2,mc}$, etc. to be executed at time step p, the feedback loop being denoted by arrow 314 which includes modifying the control inputs 302 to reduce the total cost 316 until a minimum cost is found.

According to at least one non-limiting exemplary embodiment, the footprint of the robot 102 may be defined using a continuous differentiable function stored in memory 120, wherein the robot 102 may navigate using egocentric coordinates. The egocentric coordinates configure the function which defines the robot 102 footprint to remain static, provided the robot 102 does not comprise any features (e.g., autonomous gripper arms) which may change the footprint of the robot 102. The MPC pose prediction block 306 may utilize a kinematic model of the robot 102 to evaluate the future environment as perceived within the egocentric coordinate system (i.e., calculate relative motion of objects during execution of control command $u_{p-1,mc}$).

According to at least one non-limiting exemplary embodiment, the kernelized footprint may be further defined by one or more features of the robot 102 that change its footprint. For example, the robot 102 may include an extendable arm, a brush, or other portion which causes changes in the robot 102 footprint. Accordingly, the function may be further dependent on state parameters of the feature of the robot 102.

The optimizer 318 may receive a plurality of inputs from the cost map evaluation block 310, total cost 234, control inputs 302, and outputs from some, none, or all of the blocks 304, 306, 308, 312, and 314. The optimizer may be configured to perform an auto differentiation such that a derivative of the total cost 234 may be evaluated with respect to the future control commands 208 $u_p$ available to the robot 102 after execution of the current control command 208 $u_{p-1,mc}$. The optimizer 318 may be implemented using, for example, the TensorFlow framework. Upon the optimizer 318 determining a derivative of the total cost 234 with respect to the control inputs 302 (i.e., motion primitives 202 of a library 240), the optimizer 318 may perform a gradient descent to determine a minimum cost motion command 242 $u_{p,mc}$ comprising one motion command from the range of evaluated future motion commands $u_p$ comprising a minimum total cost 234, as further illustrated below in FIG. 5A-B. The determined minimum cost motion command 242 $u_{p,mc}$ may then be executed by a controller 118 of the robot 102 during the subsequent time step p to configure motion of the robot 102 along a target trajectory.

It is appreciated that during execution of the determined minimum cost motion command 242 $u_{p,mc}$ (i.e., during time step p) the system may repeat the above calculations to determine a minimum cost motion command 242 $u_{p+1,mc}$ to execute at time step p+1. Advantageously, the system illustrated in FIG. 3 allows for a continuous motion of the robot 102 in real time without interruption as the robot 102 may calculate a sequence of minimum cost motion command 242 $u_{p,mc}$, $u_{p+1,mc}$, $u_{p+2,mc}$, etc. and execute the motion commands sequentially to effectuate optimal motion of the robot 102 along a target trajectory. Further, the system may update the sequence of motion commands upon detecting a new environmental context (e.g., a new obstacle).

One of ordinary skill in the art may appreciate that some or all of the functional blocks illustrated in FIG. 3 may be illustrative of a controller 118 of a robot 102 executing specialized instructions or algorithm from memory 120, or alternatively a processor 130 in the controller 118 executing specialized algorithm or instructions from memory 132. Similarly, the system illustrated in FIG. 3 may be a separate system from the controller 118 and memory 120, comprising a separate processor and non-transitory computer readable memory (e.g., an external server).

Figure 8A:
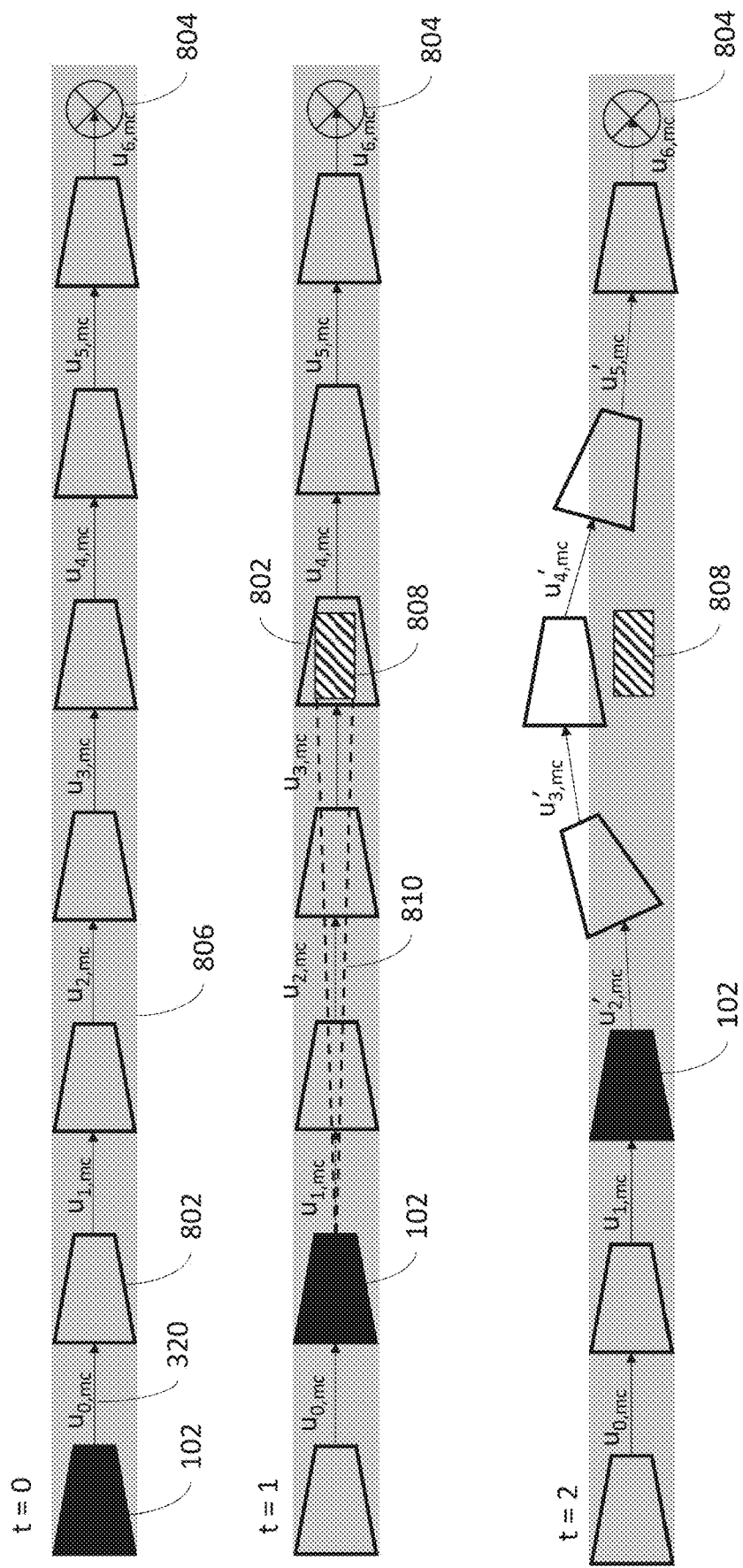
FIG. 8A illustrates a robot navigating along a trajectory utilizing a sequence of minimum cost motion commands and updating the sequence based on new environmental context data, according to an exemplary embodiment.

By way of an illustrative example, a robot 102 may begin at a starting pose $(x_o, y_o, \theta_o)$ and be tasked with following a route. The control inputs 302 may comprise a sequence of (v, ω) control inputs 302 for a differential drive robot 102 which, when executed in sequence, configure the robot 102 to follow the route; v represents translational velocity and ω represents angular velocity. In some instances where robot 102 is a tricycle drive robot, the control inputs may include (v, α), where α denotes a front wheel steering angle. The sequence may comprise, for example, the robot 102 executing $(v_1, \omega_1)$ at time step 1, subsequently executing $(v_2, \omega_2)$ at time step 2, and so forth up to $(v_N, \omega_N)$, wherein each time step may comprise 10 ms, 50 ms, 100 ms, etc. Small time steps are preferred however the size of the time step may be limited by computing resources available to a controller 118 of the robot 102. The controller 118 may determine the sequence $[(v_1, \omega_1) \ldots (v_N, \omega_N)]$ at time step zero. Upon execution of the first motion command $(v_1, \omega_1)$, the subsequent control inputs $(v_2, \omega_2)$ to $(v_N, \omega_N)$ may be clipped (i.e., bounded), and provided to the MPC pose prediction block 306 such that the controller 118 may determine location of the robot 102 as it executes the sequence of control inputs 302 (e.g., as shown in FIG. 8A). During execution of the sequence, an object may move into the path of the robot 102. In doing so, cost map evaluation block 310 may produce a high environmental cost which may be reduced if the controller 118 modifies the sequence of control inputs 302 within the bounds set by block 304. Accordingly, as discussed in FIG. 4A-E below, determining an environmental cost 232 as a continuous function of the robot 102 (x, y) position may enable the controller 118 to modify the sequence of control inputs 302 to minimize environmental costs, and thereby total costs 316, using a gradient of the environmental cost 232 with respect to (x, y) position of the robot 102 to, in part, define a gradient of the total cost 316 function, the total cost 316 being a function of control inputs 302 and/or potential movements of the robot 102.

Figure 4A:
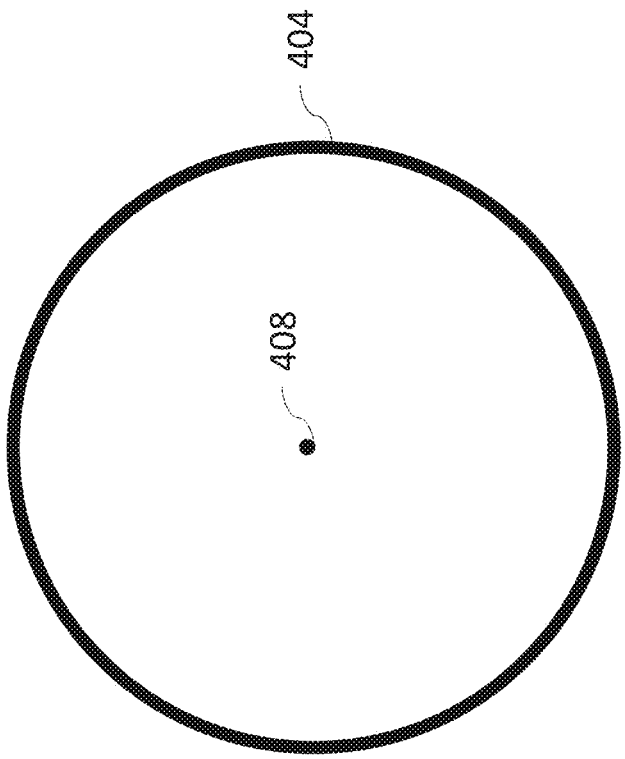
FIG. 4A illustrates a non-kernelized and kernelized footprint of a circular robot in accordance with some embodiments of this disclosure.
Figure 4A:
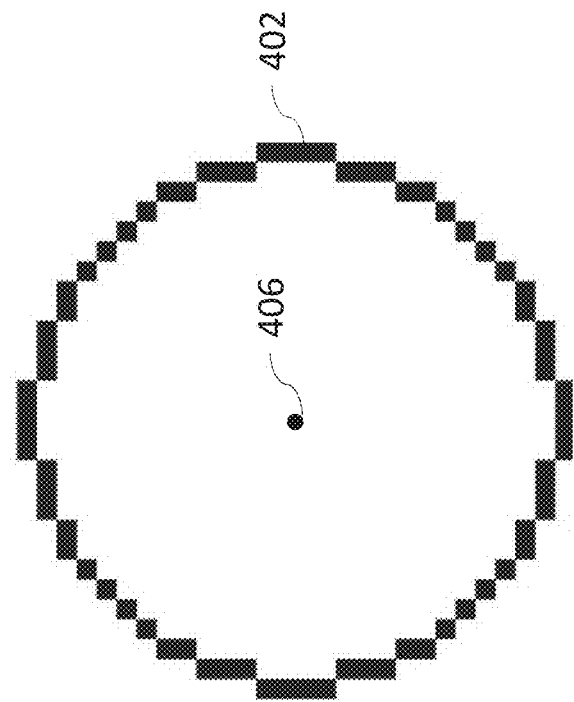
Figure 4B:
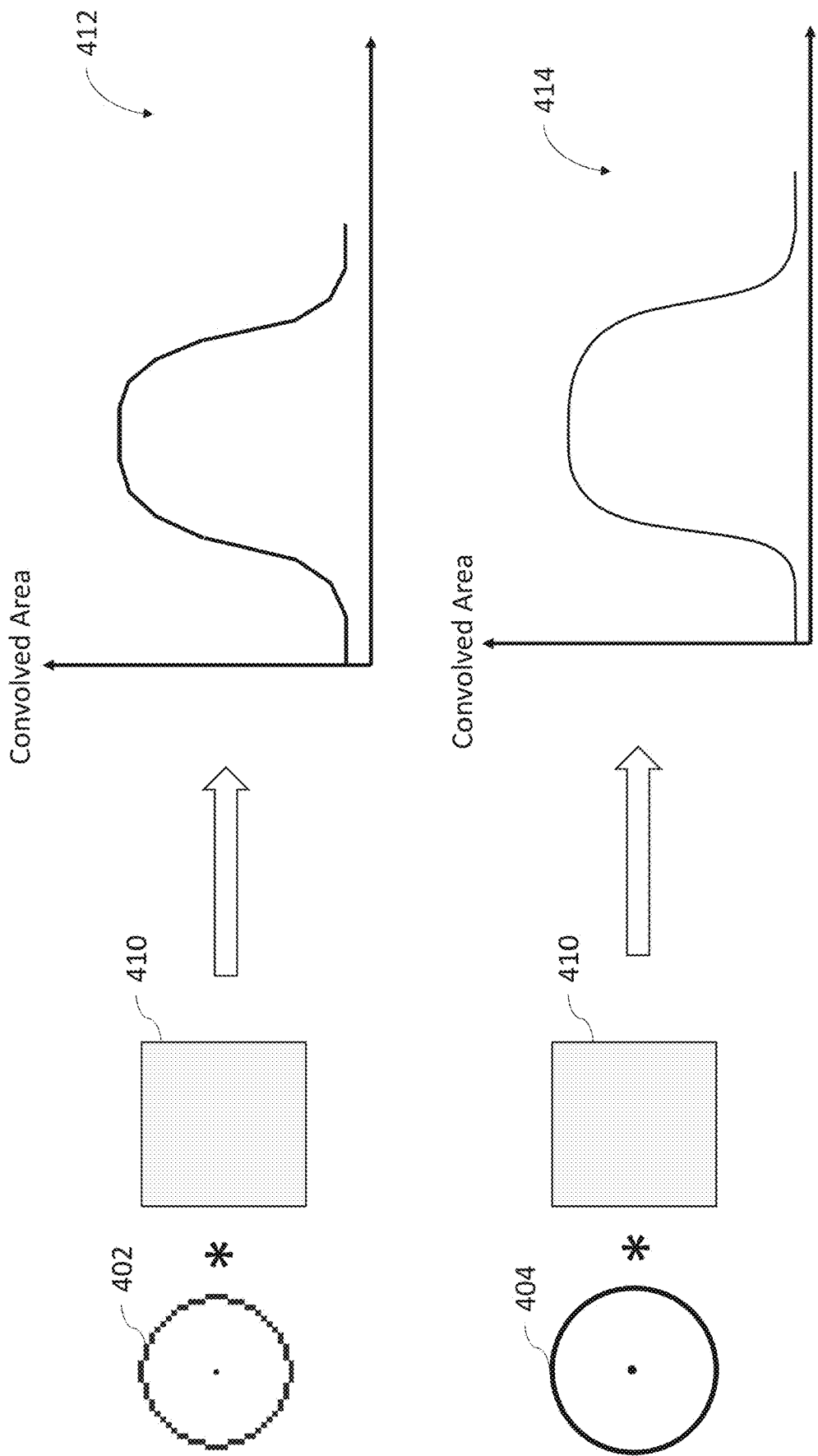
FIG. 4B illustrates an area convolution between a non-kernelized footprint and a perfect rectangle and an area convolution between a kernelized footprint and the perfect rectangle to illustrate how a kernelized footprint generates a continuous and differentiable area convolution, according to an exemplary embodiment.

FIG. 4A illustrates two footprints of a circular robot 102 wherein footprint 402 is a pixel-wise representation of the robot 102 and footprint 404 is a kernelized footprint of the robot 102, according to an exemplary embodiment. The footprint 402 may be defined about a center point 406 using a radius of n pixels, n being a positive integer number. Accordingly, the footprint 402 comprises a discretized representation of space occupied by the circular robot 102. A total cost 234 of a motion command may comprise in part an environmental cost 232, as illustrated in FIG. 2C-D above. For an optimizer 318 to determine minimum cost motion command 242 $u_{p,mc}$ for a subsequent time step p, the total cost 234 as a function of all future motion commands $u_p$ is required to be continuous and differentiable such that a gradient descent may be performed. Accordingly, discretizing the footprint 402 may in part discretize the environmental cost 232 thereby causing the total cost 234 function, a function of the environmental cost 232 of the future motion commands $u_p$, to become discretized, wherein a derivative of the total cost 234 as a function of the future motion commands $u_p$ may be undefined or infinite for the discretized function.

Footprint 404 may comprise a kernelized footprint of the robot 102 comprising a continuous function centered about a point 408. The continuous function may comprise a Cartesian representation of a circle (i.e., $r^2=x^2+y^2$, r being the radius), polar representation (i.e., r=C, C being the radius), or any other reference coordinate representation of the footprint of the robot 102. For robots 102 of more complex shapes, additional functions may be utilized (e.g., Gaussians, more circles, etc.) to define the shape of footprint 404, as shown below in FIG. 4C.

Advantageously, use of a kernelized footprint may further enhance environmental cost evaluation performed by the cost map evaluation block 310, illustrated in FIG. 3 above, as the convolved overlap area between a kernelized footprint 404 and an object on a map comprises a continuous differentiable function, whereas a convolved overlap area of a discretized footprint 402 comprises a continuous non-differentiable function. Additionally, when utilized in conjunction with a continuous range of potential motion commands, use of the kernelized footprint may yield an unconventional result in that a derivative of the total cost 234 with respect to the continuous range of motion commands $u_p$ may be determined as the environmental cost 232, proportional to a convolved overlap area between a footprint and environmental objects, may be a continuous differentiable function as illustrated next in FIG. 4B.

Figure 5A:
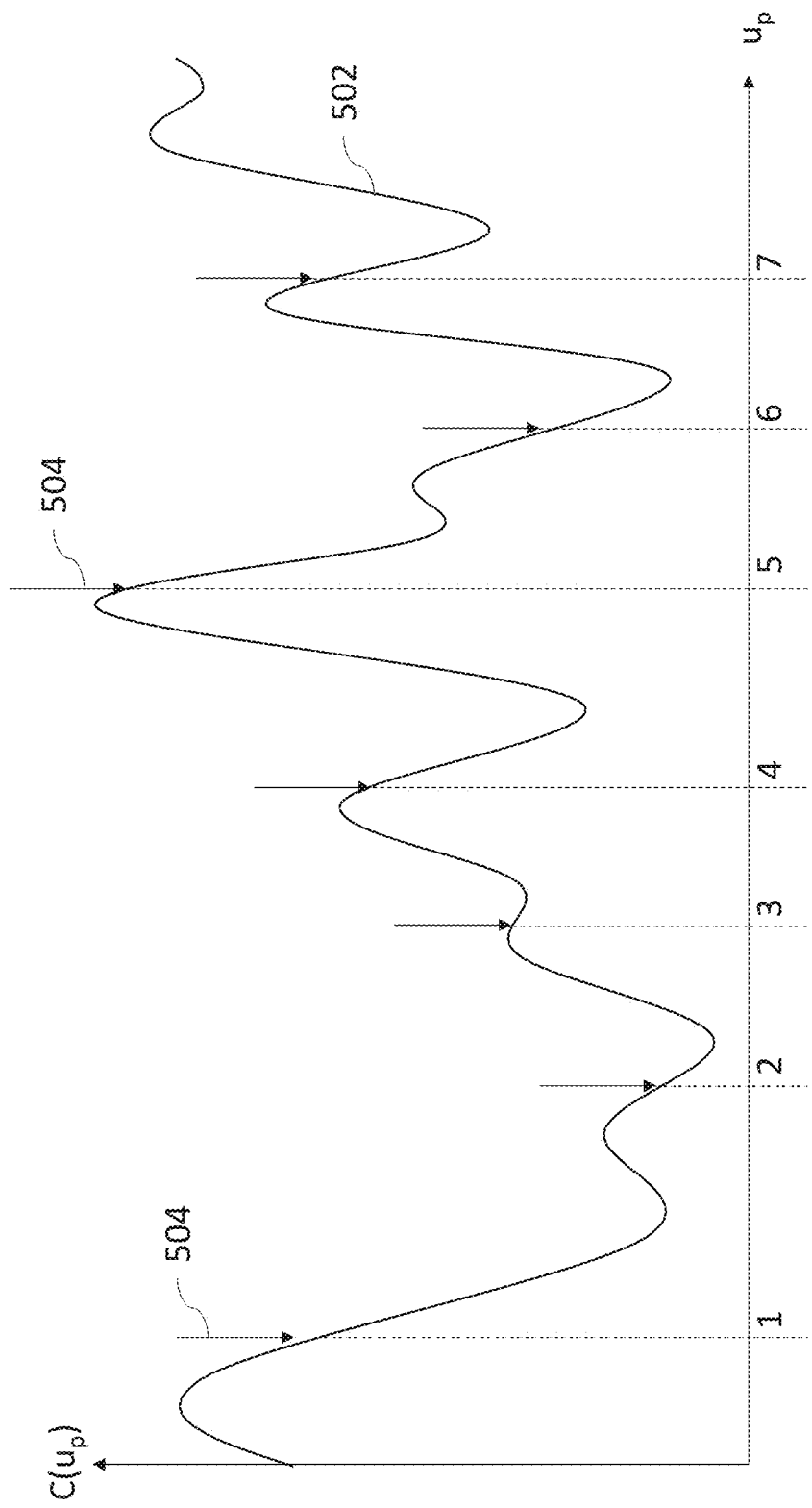
FIG. 5A illustrates an evaluated cost function $C(u_p)$ comprising a continuous function of cost values associated with motion command $u_p$, according to an exemplary embodiment.

FIG. 4B illustrates a convolution of a pixelated footprint 402 and a kernelized footprint 404 to illustrate an effect of kernelizing a footprint on a resulting convolved area utilized to determine an environmental cost 232, according to an exemplary embodiment. Environmental costs 232 for a given motion command may be proportional to an amount of overlap area a footprint of a robot 102 overlaps with environmental obstacles (e.g., objects or obstacles 222 or zone 224 illustrated in FIG. 2C above) during execution of a motion command 202 and may be evaluated as, for example, a convolution between the object and the footprint of the robot 102. A convolution of a pixelated footprint 402 and a perfect rectangle 410, representative of an environmental object on a 2D pixelated map (e.g., a shelf), yields a graph 412 comprising a continuous non-differentiable function. The horizontal axis of graphs 412, 414 maybe time or position of the footprints 402, 404 as the footprints 402, 404 are moved over the rectangle 410 at a constant rate. Due to the discretization of the footprint 402, the area convolution comprises a piecewise function and is not differentiable. Unlike the footprint 402, kernelized footprint 404, however, yields a smooth continuous and differentiable convolved area function. The differentiability of the convolved area function may be utilized to generate a continuous and differentiable environmental cost 232 function (e.g., computed my cost map evaluation block 310 illustrated in FIG. 3 above), and thereby a continuous and differentiable total cost function as illustrated in FIG. 5A-B below, such that a gradient descent may be performed on the total cost 234 function to determine a minimum cost motion command 242 $u_{p,mc}$ for the robot 102 to execute. The kernelizing of footprint 404 is done ahead of time (e.g., the kernelized function of the footprint may be stored in memory 120) or as the robot 102 executes a current motion command $u_{p-1,mc}$, whereas environmental costs 232 are computed in real time as the robot 102 computes its next minimum cost motion primitive 202 to be executed based on changes within its environment and its motion (i.e., relative motion of objects in an egocentric coordinate system).

Figure 6A:
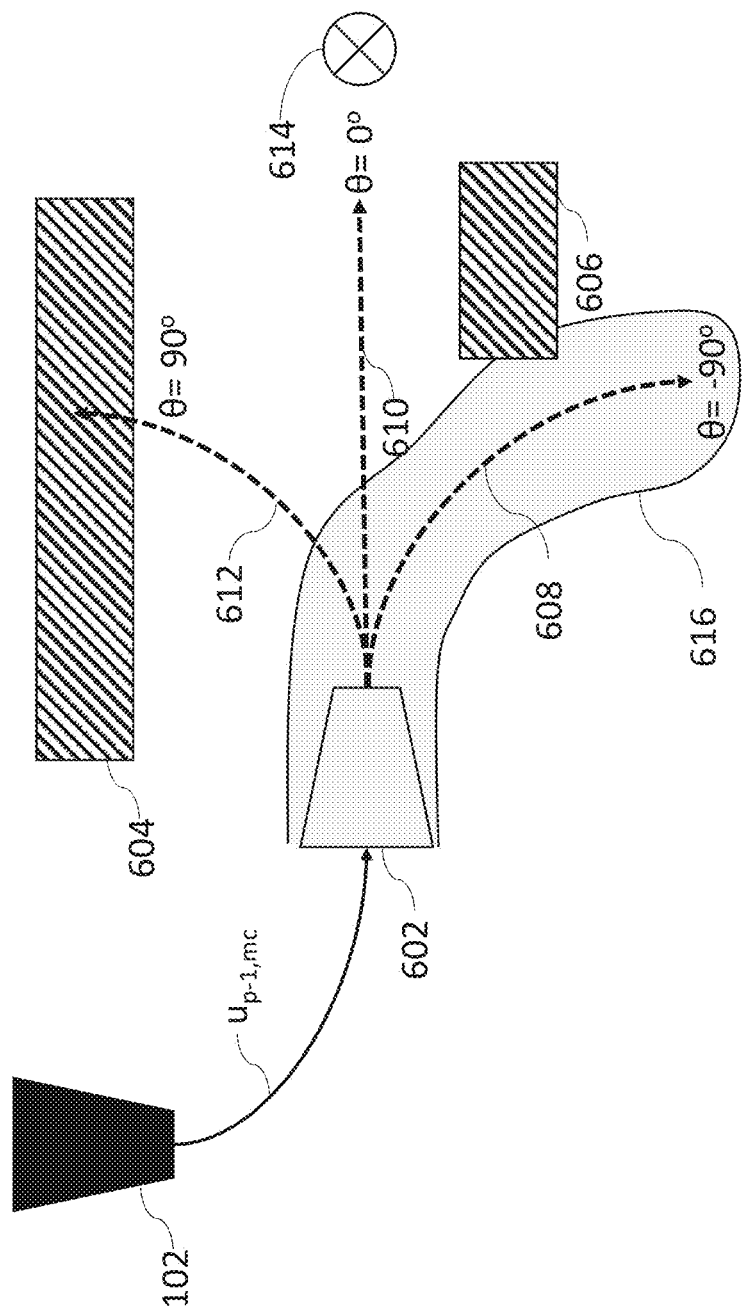
FIG. 6A is a top view of a robot determining a minimum cost motion command to execute after its current motion command based on environmental context, control costs, and a target trajectory, according to an exemplary embodiment.

It is appreciated by one skilled in the art that calculating a convolution between a robot footprint 404 and an object such as rectangle 410 or shapes that are more complex may be computationally taxing and slow. Accordingly, many publicly available frameworks, such as TensorFlow, may be utilized to perform an area convolution, or similar algorithm (e.g., operation 228), to determine an environmental costs 232 proportional to an amount of overlap between a footprint 404 and environment objects during execution of a motion command 202. That is, the convolution, as illustrated in FIG. 4B, is intended to be illustrative of an effect of kernelizing a footprint 404 of a robot 102 to yield a continuous convolved (i.e., overlapping) area as the footprint 404 is moved over an object, representative of a robot 102 executing a motion command 202 or sweeping future motion commands across a continuous range as illustrated in FIG. 6A, and is not intended to be limiting (e.g., overlap may be calculated using a dot product of tensors). For example, the convolution operation (i.e., sliding of footprints 402, 404 over a rectangle 410 to determine an overlap) may be illustrative of an output of an MPC pose prediction block 306 calculating a motion of a robot 102 in response to a control input (v, ω).

Figure 4C:
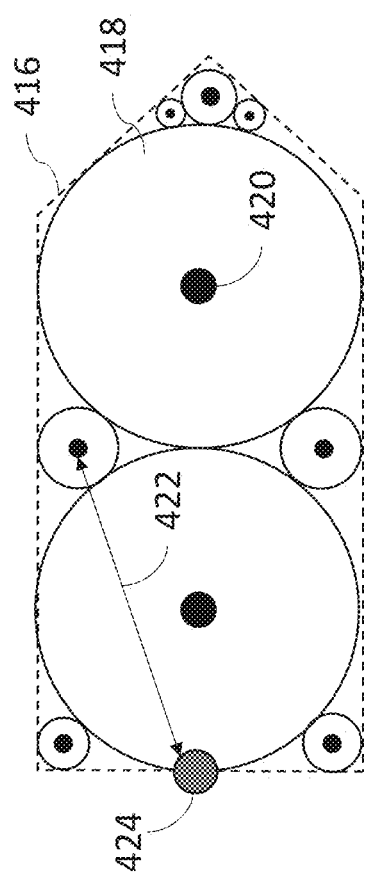
FIG. 4C illustrates a kernelized footprint of a robot, according to an exemplary embodiment.

FIG. 4C illustrates an exemplary kernelized footprint of a robot 102. The footprint 416 (dashed lines) may represent a true shape of the robot 102. To approximate the shape of the robot 102, a plurality of non-overlapping circles 418 of varying radii may be positioned within the footprint 416. Each circle 418 comprising a defined location of its center 420 and a fixed radius. The plurality of circles 418 are utilized to approximate the shape of a robot 102 using continuous differentiable functions which may be utilized to determine a continuous and differentiable environmental cost, as shown next in FIG. 4D. The parameters of the circles 418 (i.e., locations of centers 420 and radii) used to define an approximate footprint 416 of the robot 102 may be stored within memory 120. The centers 420 may comprise a defined location within the footprint 416 based on a fixed transformation 422 from an origin 424 of the robot 102. The origin 424 of the robot 102 may comprise a predefined dimensionless point on the robot 102 which denotes its position. For example, the robot 102 being at position (x=5, y=5, z=5) corresponds to origin 424 being at location (5, 5, 5). Transform 422 may represent a matrix which translates a coordinate frame from being centered at the robot origin 424 to the center 420 of a circle 418. Centers 420 and robot origin 424 do not move with respect to each other and hence transform 422 between the robot origin 424 and any center 420 remains fixed. Accordingly, localizing the origin 424 also localizes centers 420 of circles 418.

According to at least one non-limiting exemplary embodiment, robot origin 424 may be defined at any point inside the footprint 416 or outside the footprint 416 of the robot 102. For example, the origin 424 may be located at the center of mass, center of a wheel axel, or a point external to the robot 102 footprint 416, provided the origin 424 remains in a fixed location within egocentric coordinates centered about the robot 102. That is, the origin 424 is not intended to be limited to the illustrated location within the footprint 416. Similarly, the shape of footprint 416 and configuration of the circles 418 therein is not intended to be limiting.

Figure 4D:
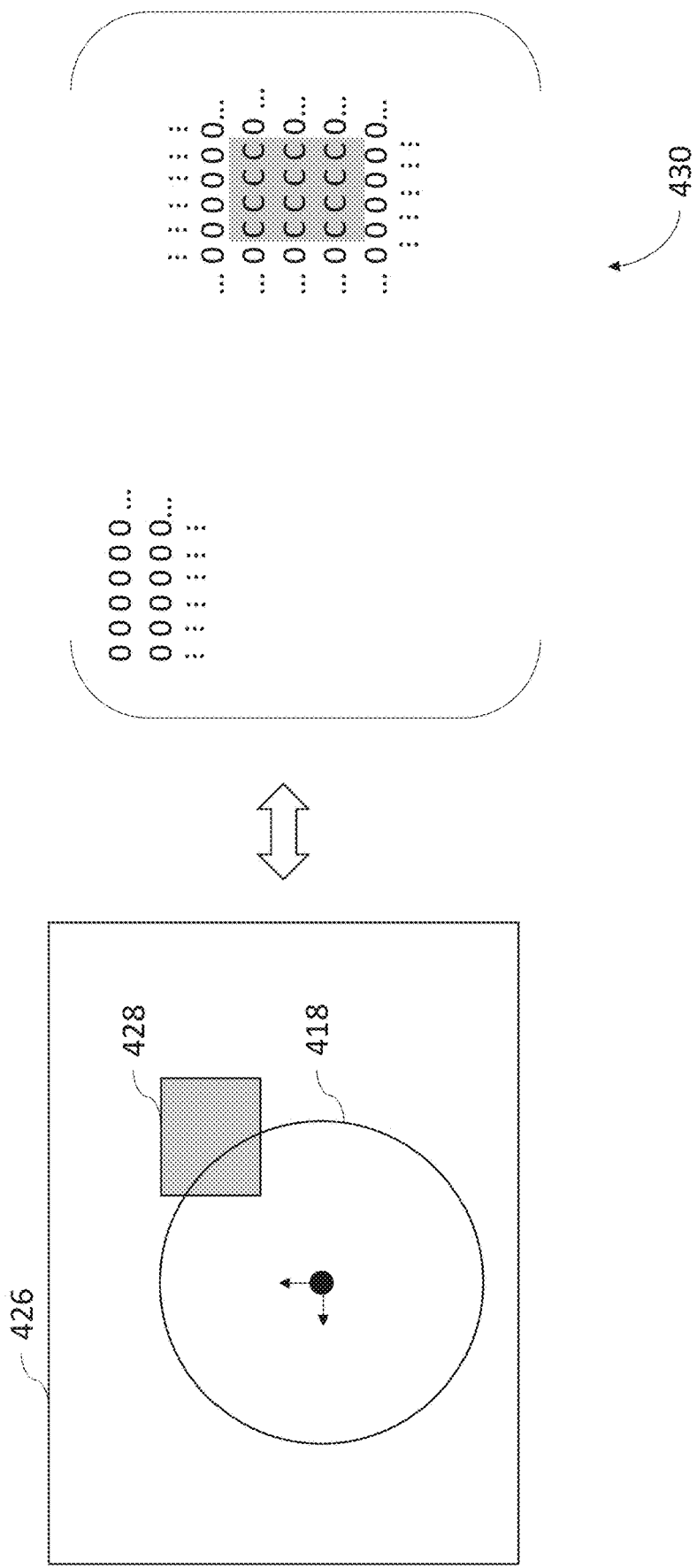
FIG. 4D illustrates a method for calculating a continuous and differentiable environmental cost as a function of position of a robot, according to an exemplary embodiment.

FIG. 4D illustrates a method for calculating a continuous environmental cost function as a function of position of a circle 418 representing a footprint, or portion thereof, of a robot 102, according to an exemplary embodiment. The circle may represent one of a plurality of circles 418 which denote a footprint of a robot 102, as shown in FIG. 4C for example. Only one circle 418 is considered for simplicity and clarity of the explanation below.

The map 424 may comprise a plurality of pixels, each pixel comprising a cost associated thereto. The cost values associated with the plurality of pixels may be represented as a cost matrix 430, wherein the cost matrix 430 may include a number of rows and columns equal to a number of pixels of the height and width of the map 424, respectively. For example, the map 424 may be 600×500 pixels, wherein a cost matrix may comprise 600×500 values (i.e., rows× columns). Each entry in the cost matrix 430 may include a weight or cost for each pixel of the map 424, wherein low weights are assigned to pixels denoting a route for the robot 102 to follow and high weights are assigned to pixels denoting objects, such as object 428. By way of illustration, the entries of the cost matrix 430 which represent objects 428 are shaded in grey and comprise a nonzero cost of C. The remaining pixels corresponding to empty space may comprise a cost of 0. In some instances, the values of each pixel may further depend on a distance of the pixel from the route of which the robot 102 is to navigate, however this has been omitted from the matrix 430 for clarity.

To determine an environmental cost as a continuous function of the position of the circle 418, i.e., position of the robot 102 using a discretized map 424, a distance may be calculated between the center of the circle 418 and each pixel of the map 424 following equation 2 below:

$$\text{Distance}(x,y,k)=\sqrt{(R_x P_{k,x}-x)^2+(R_y P_{k,y}-y)^2} \quad \text{(Eqn. 2)}$$

Where x and y represent spatial position of the center of circle 418 and are real valued numbers and comprising a unit of distance (e.g., meters, centimeters, inches, etc.). $P_{k,x}$ corresponds to a horizontal position of an $k^{th}$ pixel and $P_{k,y}$ corresponds to a vertical position of the pixel, wherein $P_{k,x}$ and $P_{k,y}$ are integer numbers with no units. For example, the top left pixel may be ($P_{k,x}$=0, $P_{k,y}$=0), the bottom right pixel may be ($P_{k,x}$=M, $P_{k,x}$=N) where M corresponds to the width, in pixels, of the map 424 and N corresponds to the height, in pixels, of the map 424. Values $R_x$, $R_y$ represent the spatial resolution of the map 424 in units of meters, centimeters, inches, etc. per pixel. For example, each pixel may represent 3×3 cm area, wherein $R_x$ and $R_y$ would be equal to 3 cm per pixel, however it is appreciated that $R_x$ and $R_y$ may comprise different values.

To determine an environmental cost as a function of (x, y) of the center of the circle 418, a sigmoid function may be utilized in conjunction with a cost matrix 430. The cost matrix 430 may comprise a width and height equal to the number of pixels of the map 424 along the width and height axis, respectively. For example, pixels of the map 424 representing empty space may include a cost weight of zero (0) and pixels of the region 428 representing an object may include a cost weight of substantially more than zero (e.g., C=5000). Environmental cost 234 may accordingly be calculated following equation 3 below:

$$\text{Cost}_{env}(x,y)=\Sigma_k \Sigma_{i,j} \sigma(\text{Distance}(x,y,k)) \cdot W_{i,j} \quad \text{(Eqn. 3)}$$

Where a is a sigmoid function centered about the radius of the circle 418 and $W_{i,j}$ represents a weight value of the pixel of the cost matrix 430 located at row i and column j. The sigmoid function is a continuous function comprising values ranging from zero to one. The sigmoid function may comprise a value of approximately one for distances less than the radius of circle 218, a value of 0.5 at a distance equal to the radius, and values which fall off to zero at distance greater than the radius (i.e., outside of the circle 418). Each entry of the cost matrix $W_{i,j}$ may be multiplied by the sigmoid of the distance function and summed together to yield a cost for a $k^{th}$ pixel. This may be repeated for each pixel k of the map 424, as shown by the outer summation. That is, a sigmoid of the distance between the center of circle 418 and a pixel of the map 424 may be calculated, the sigmoid of the distance is then multiplied by all values within the weight matrix $W_{i,j}$, and the resulting multiplications are summed together to provide a cost for the pixel k for the given position of the circle (x, y). This may be repeated for each of the pixels of the map 424 to produce a total cost comprising a single numerical value. Accordingly, the environmental cost 232 may comprise a continuous function of x, y (i.e., position of a robot 102).

It is appreciated that the sigmoid a (distance) comprises values substantially close to zero for all distances outside the circle 418 and comprises values substantially close to one for distances within the circle 418. In some instances, the sigmoid function may be denoted as σ(distance −R), where R is the radius of the circle 418 and the sigmoid a is centered at zero. Accordingly, when multiplying the sigmoid of the distance with entries of the cost matrix $W_{i,j}$, pixels outside the circle may yield substantially low costs and pixels within the circle 418 may yield costs substantially similar to a summation of all values of the weight matrix $W_{i,j}$. Accordingly, pixels of the map 424 which lie within the circle 418 and represent object 428 may comprise a large value substantially close to C whereas pixels of the object 428 beyond the circle may comprise values equal to C multiplied by an approximately zero value. That is, the environmental cost 232 is heavily weighted to a summation of costs of pixels within the circle 418 as opposed to pixels outside the circle 418.

The total environmental cost of a robot 102 at a position (x, y) may further include calculating costs shown by equations 2-3 above for each circle 418 which defines a footprint 416 of the robot 102, wherein the costs for each circle may be further summed to produce the total environmental cost 232 as a function of position of the robot 102.

It is appreciated that any differential motion of the circle 418 along an x- or y-axis may either increase or decrease the cost function as a function of the differential motion. For example, a small motion along negative x (i.e., leftward) of the circle 418 on map 426 may reduce an environmental cost by reducing overlap between the circle 418 and object 428, wherein this reduction in cost is a continuous and differentiable function of (x, y) position of the circle 418. Accordingly, a gradient descent may be utilized to determine any modifications to position 418, which may reduce environmental cost 232, as shown below in FIGS. 4E-F.

According to at least one non-limiting exemplary embodiment, values of the cost matrix 430 may further comprise other non-zero values which do not represent object 428. For example, nonzero cost values may be assigned to pixels directly surrounding the object 428 corresponding to risk zones 222 illustrated in FIG. 2C above. As another example, pixels deviating from a route may comprise an increasing (e.g., exponential) cost as a function of distance from the route to encourage the robot 102 to not deviate from the route. In some embodiments, a route may be present in map 426, wherein pixels representing the route may include a substantially low, zero, or negative cost represented in matrix 430.

According to at least one non-limiting exemplary embodiment, map 424 may comprise a cropped portion of a larger computer readable map of an environment. The cropped portion being centered about an origin 424 of the robot 102. Use of a small portion of a larger computer readable map to evaluate environmental costs may reduce computation time by reducing a number of pixels considered during the cost evaluation.

Figure 4E:
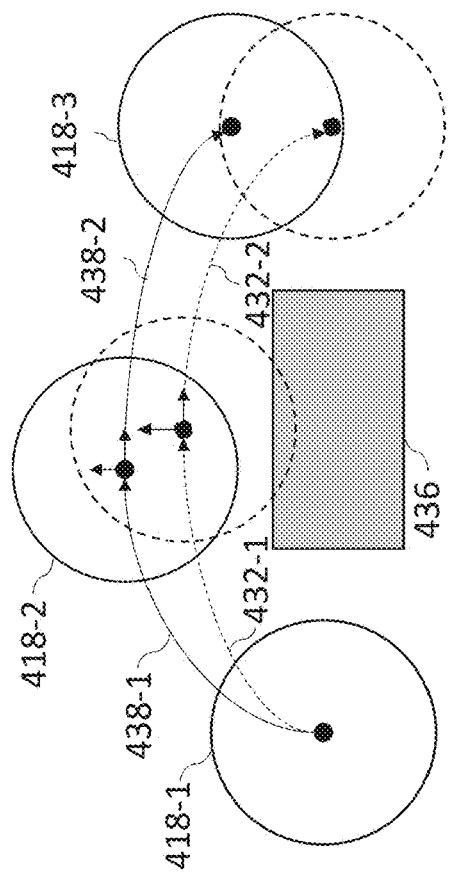
FIG. 4E(i-ii) illustrates a modification to a route to minimize an environmental cost using a kernelized footprint of a robot according to an exemplary embodiment.
Figure 4E:
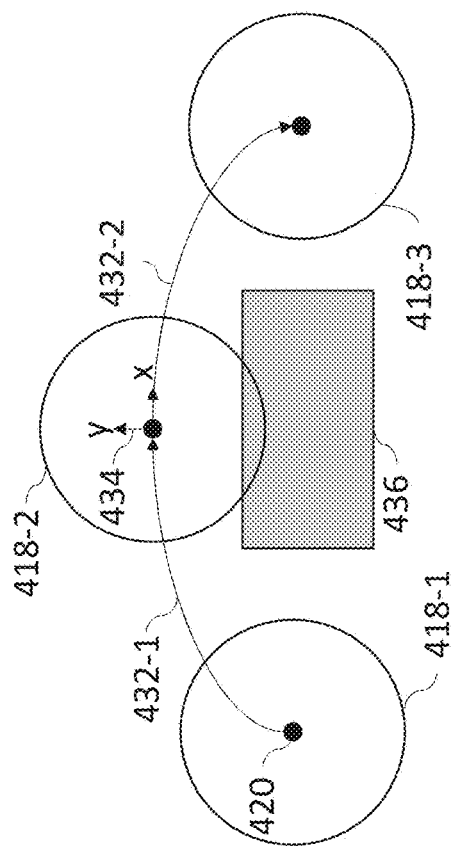

FIG. 4E(i-ii) illustrates a modification to a route to minimize an environmental cost 232, according to an exemplary embodiment. The route may include the robot 102 navigating around an object 436. First, in FIG. 4E(i) a robot 102 may comprise a footprint 416 defined using one or more circles 418, only one circle has been illustrated. The robot 102 may be executing two control inputs 302 ($v_1$, $\omega_1$) 432-1 and ($v_2$, $\omega_2$) 432-2 which configure motion of the robot 102 from the location of circle 418-1 to 418-3. As shown, upon executing control input 302 of (v₁, ω₁) 432-1, the circle 418-2 overlaps in part with an object 436. As shown in FIG. 4D, the environmental cost 232 may be substantially large indicative of a collision. Accordingly, a controller 118 of the robot 102 may modify the control inputs 302 executed to avoid the collision.

With reference to FIG. 3, a current state of the robot 102 may be illustrated by circle 418-1. The circle 418-1 may include a kernelized footprint of the robot 102. The MPC pose prediction block 306 may produce the future locations 418-2, 418-3 responsive to execution of control inputs (v₁, ω₁) 432-1 and (v₂, ω₂) 432-2, wherein the environmental cost block 310 may output a substantially large cost due to overlap of circle 418-2. As shown in equations 2 and 3, the environmental cost 232 may be defined as a continuous differentiable function of the (x, y) position of the circles 418. Accordingly, controller 118 may determine if any differential motion along x- and y-axis of circle 418-2, shown by axis 434, reduces the environmental costs.

Next in FIG. 4E(ii), a modified route 438 may be determined based on modifying control inputs 302 (v₁, ω₁) 432-1, (v₂, ω₂) 432-2 to (v₁', ω₁') 438-1 and (v₁', ω₁') 438-2, respectively. Controller 118 may determine that moving the location of circle 418-2 upward (i.e., along +y) may configure the circle 418-2 to no longer intersect with object 436. Following equations 2 and 3 above, modifying the center 420 of the circle 418-2 by a +y value may reduce the environmental cost 232 following a continuous and differentiable function. The MPC pose prediction block 306 may utilize a forward model of the robot 102 to determine a control input 302 (v₁', ω₁') 438-1 which causes the robot 102 to move from location 418-1 to the new location 418-2. The movement of the circle 418-2 along the x-axis may be responsive to control inputs 438 lasting a predetermined amount of time and/or may be further based on reducing control by maintaining v₁=v₁'. Modification of the circle 418-2 to the new position illustrated may further cause modifications to subsequent control commands 438-2 and future positions of the circle 418-3, wherein the previous locations of the circles 418-2, 418-3 have been illustrated using dashed lines for reference.

Figure 4F:
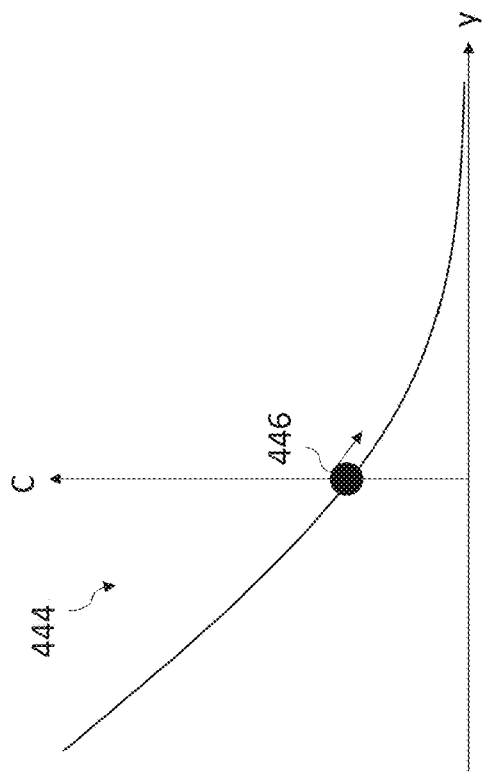
FIG. 4F(i-ii) illustrates two graphs of environmental cost as a function of motion of a kernelized footprint of a robot illustrated in FIG. 4E(i) above along x and y axis according to an exemplary embodiment.
Figure 4F:
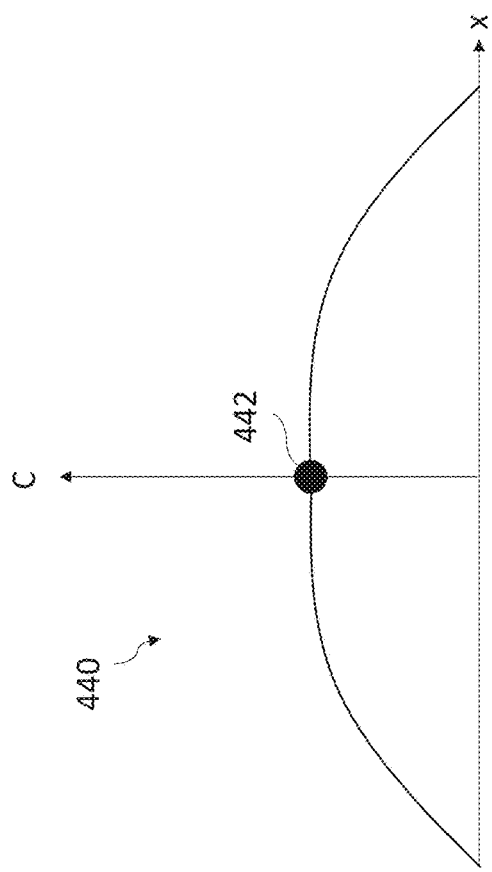

FIG. 4F(i-ii) illustrate two graphs of environmental cost 232 as a function of motion of a circle 418-2 illustrated in FIG. 4E(i) above along x- and y-axis, according to an exemplary embodiment. Point 442 of the graph 440 may illustrate an x-coordinate value of the center 420 of circle 418-2 shown in FIG. 4E(i) above which may be zero or any other value. Graph 440 includes no motion along the y-axis. As shown by graph 440, the environmental cost 232 as the center 420 of the circle 418-2 is moved about ±x axis (i.e., leftward or rightward in FIG. 4E(i)) remains substantially flat and of nonzero value. The graph 440 decreases to zero as the circle 418 is moved substantially far along the x-axis beyond the object 436. By clipping control inputs in block 304 of FIG. 3, the controller 118 may determine that moving the circle 418-2 substantially far along the x-axis may exceed predetermined bounds for control inputs 302. Accordingly, the y-component may be modified as shown next in FIG. 4F(ii) by graph 444 which depicts an environmental cost as a function of movement of the center 420 of circle 418-2 along the y axis (i.e., vertically with respect to FIG. 4E(i)). Graph 444 includes no motion along the x-axis. Movement along the negative y-axis may substantially increase environmental costs 232, corresponding to downward movement of the circle 418-2 in FIG. 4E(i) which causes substantially more overlap with the circle 418-2 and the object 436. Inversely, moving the center 420 along positive y-axis (i.e., upwards) moves the circle 418-2 farther from the object 436. This is shown by the point 446, representing the y-coordinate location of the center 420 of circle 418, moving rightward along the positive y direction to reduce environmental cost 232.

It is appreciated that substantial movement along either x- or y-axis may reduce environmental costs 232 however control costs 204 may increase. For example, moving the center 420 of circle 418-2 substantially far along the y-axis may reduce environmental costs 232 but control costs 204 proportional to a deviation from the route may increase to counteract the reduction in environmental costs 232. It is further appreciated that both x and y positions of the circle 418-2 may be modified, wherein the cost graphs 440, 444 may be illustrative of slices of a two-dimensional sheet representing cost as a function of both (x, y).

Advantageously, use of a kernelized footprint of a robot 102 using one or more circles 418, or other continuous functions, may provide a controller 118 or optimizer 318 with the means for determining modifications to one or more states or poses of the robot 102 to minimize environmental costs using a gradient descent. The states may be represented by the locations of the various circles 418-1, 418-2, 418-3 of FIG. 4E and the modification being illustrated in FIG. 4E(ii). The modifications of these states to reduce environmental costs 232 may be utilized by the MPC pose prediction block 306 to determine control inputs 438 (e.g., (v, ω)) which move the robot 102 from a first or current state (e.g., 418-1) to the modified states (e.g., 418-2 shown in FIG. 4E(ii)).

FIG. 5A illustrates a cost graph 502 of a cost function $C(u_p)$ as a function of a continuous range of possible control inputs 302 $u_p$, according to an exemplary embodiment. The control inputs 302 may include any number of control parameters (e.g., (v, ω), angle of a steering shaft a, etc.), wherein the graph 502 includes a cost $C(u_p)$ as a function of one parameter for clarity. The cost graph 502 may be provided to an optimizer 318, illustrated in FIG. 3, at a previous time step p-1 based on evaluating a total cost 234 for the continuous range of possible motion commands 202 $u_p$. The optimizer 318 may, upon receiving the cost graph 502, evaluate a cost of K random motion commands 202 $u^m_p$, K being a positive integer number and index k ranging from zero to K (e.g., K=7 for this non-limiting embodiment). The random motion commands 202 $u^m_p$ are chosen to comprise many varying motions of the robot 102. For example, an optimizer 318 may test a left turn, right turn, forward movement, backward movement, etc., motion commands 202 $u^m_p$, wherein each motion command 202 tested comprises the robot 102 performing largely different motions, as further illustrated below in FIG. 6A. Total costs 316 for each of the randomly chosen motion commands 202 may be chosen as starting points 504 on the total cost function 502 to be utilized in a gradient descent operation illustrated next in FIG. 5B. It is appreciated that the cost function $C(u_p)$ comprises a continuous and differentiable function as a result of the kernelized footprint 404 of the robot 102 being a continuous function. Further it is appreciated that the cost function 502 may be M-dimensional for M-dimensional control inputs 302, M being an integer number. For example, a differential drive robot 102 may include control inputs $u_p$ with both (v, ω) parameters, wherein graph 502 may be illustrative of a slice of a two-dimensional "cost sheet."

According to at least one non-limiting exemplary embodiment, the K random motion commands 202 utilized as initial points for a gradient descent may be chosen from a library of precomputed motion primitives, comprising a plurality of precomputed motion commands 202 further comprising precomputed control costs 204. These precomputed control and control costs 204 may be evaluated prior to navigation of a robot 102 by a controller 118 utilizing a forward model of the robot 102 to simulate execution of a motion command and evaluating rates of change of state and control parameters during execution of the motion command. Environmental costs 232 of the motion primitives may be rapidly evaluated based on an operation 228, illustrated in FIG. 2D above and/or the methods illustrated in FIG. 4A-E. Accordingly, total costs of the K random motion primitives may be quickly evaluated and further enhance a speed at which a controller 118 of a robot 102 may calculate a minimum cost motion primitive 242 $u_{p,mc}$.

FIG. 5B illustrates an optimizer 318 performing a gradient descent on a cost function 502 $C(u_p)$ to determine a global minimum 508 of the cost graph 502 to determine a minimum cost motion command 242, according to an exemplary embodiment. As illustrated, use of a plurality of randomly sampled motion commands 202 may increase a probability that the optimizer 318 detects a global minimum 508 as gradient descent may become stuck at local minima 506. Upon the global minimum 508 being determined, an associated minimal cost motion command 242 $u_{p,mc}$ may be found and executed to effectuate motion of the robot 102 at the time step p.

According to at least one non-limiting exemplary embodiment, a controller 118 may precompute control costs 204 for the K randomly selected motion commands 202 $u^k_p$ to be utilized as starting locations for a gradient descent operation. Advantageously, use of precomputed motion commands may reduce computation time and recourses as only environmental costs 232 of the precomputed motion commands may require dynamic calculation based on objects within a surrounding environment of a robot 102.

Advantageously, the use of a kernelized footprint 404 of a robot 102 may enable an optimizer 318 to determine a continuous and differentiable cost graph 502 such that a minimum cost motion command 242 $u_p$,mc may be found using gradient descent. Without the use of the kernelized footprint 404, the cost function $C(u_p)$ may comprise a discretized function, wherein the gradient descent operation may not be utilized as discretized functions comprise infinite or undefined derivatives. Additionally, it is appreciated that the method for determining a minimum cost motion command 242 $u_p$,mc may be performed during execution of a previous minimum cost motion command 242 $u_p$-1,mc such that a robot 102 executes the minimum cost motion command 242 $u_{p,mc}$ immediately upon completing the previous minimum cost motion command 242 $u_{p-1,mc}$, as further illustrated next in FIG. 6A-B, to effectuate continuous movement of the robot 102.

FIG. 6A illustrates a robot 102 utilizing a system illustrated in FIG. 3 above to determine minimum cost motion command 242 $u_{p,mc}$ to execute to effectuate movement of the robot 102 towards a target location 614, according to an exemplary embodiment. The robot 102 may be executing a current motion command $u_{p-1,mc}$ causing the robot 102, upon completion of the current motion command, to arrive at a location 602 at a future (i.e., subsequent) time step p. This location 602 may be determined by a MPC pose prediction block 306, as discussed above with reference to FIG. 3, during a previous evaluation of a minimum cost motion command (i.e., upon the MPC pose prediction block 306 determining $u_{p-1,mc}$ is a minimum cost motion command 242 for the previous time step p-1). As the robot 102 navigates to position 602 by executing the current motion command $u_{p-1,mc}$, the robot 102 may parse all potential future motion commands $u_p$ executable from the location 602 such as, for example, considering a range of turning angles θ, or equivalently a range of angular velocities ω with fixed translational velocity v, between −90° (i.e., hard right turn) to +90° (i.e., hard left turn) for cost evaluation. Three motion commands 608, 610, and 612 of the continuous range of future motion commands $u_p$ have been illustrated corresponding to turning −90°, turning 0° or going along a straight line such that there is no turning done by the robot 102, and turning +90°, respectively. Other control parameters of the motion commands are evaluated but omitted from the illustration for clarity.

An environment surrounding the robot 102 may comprise two objects 604 and 606, which may further comprise decaying risk zones 222 surrounding them, which have been omitted for clarity, used for environmental cost 232 evaluation. It is appreciated that large turning angles (e.g., θ=+90°) yields large control costs 204, whereas moving straight forward yields lower control costs 204. Additionally, total cost evaluation of any of the future motion commands $u_p$ may further consider environmental objects 604 and 606 for an environmental cost 232 evaluation. The environmental cost 232 for any given future motion command $u_p$ may be evaluated by first determining a region 616, similar to boundaries 218 discussed with reference to FIG. 2C, occupied by the robot 102 during execution of any future motion command $u_p$, using the MPC pose prediction block 306, and secondly evaluating that an area overlaps between the region 616 and any environmental objects 606 or 604 and/or risk zones 222 (e.g., an area convolution as illustrated in FIG. 4B above). Evaluating an environmental cost 232 as a function of future motion commands $u_p$ may be calculated by sweeping the region 616 across all θ. For example, future motion command 612 may yield large environmental cost 232 as it comprises navigating the robot 102 over the object 604, future motion command 608 may comprise some environmental costs as region 616 overlaps with object 606, and future motion command 610 may comprise a lowest cost of the three as it may comprise minimal change in control and state parameters while avoiding collision with objects 604 and 606. Advantageously, use of a kernelized footprint may yield an unconventional result as the environmental cost 232 as a function of the continuous range of future motion commands $u_p$ comprises a continuous and differentiable function such that a gradient descent may be performed to determine a minimum cost motion command 242 $u_{p,mc}$.

The robot 102 may evaluate a cost function $C(u_p)$, wherein the future motion commands $u_p$ are a function of steering angle θ, to determine a minimum cost motion command 242 $u_{p,mc}$ to execute upon completion of the current motion command $u_{p-1}$ (i.e., a minimum cost motion command 242 $u_{p,mc}$ to execute upon reaching location 602). It is appreciated that a cost function $C(u_p)$ may be a function of additional parameters such as, for example, evaluating a range of future motion commands $u_p$ comprising a range of translational velocity values (e.g., a robot 102 may evaluate a cost function $C(u_p)$ for future motion commands $u_p$ comprising a range of velocity values from 0 to 5 meters per second along a given steering angle θ). That is, the embodiment wherein the robot 102 evaluates the cost function $C(u_p)$ as a function of steering angle θ alone is illustrated for clarity and is not intended to be limiting.

According to at least one non-limiting exemplary embodiment, a cost function $C(u_p)$ may comprise a X-dimensional function of many parameters (e.g., steering angle θ, translational velocity v, etc.), X being a positive integer number, wherein a 2D cost function $C(u_p)$ of a single changing parameter θ of the future motion commands $u_p$ is illustrated for clarity.

It is additionally appreciated that kernelization of a footprint of the robot 102 is necessary (but not sufficient) to generate a continuous and differentiable cost function $C(u_p)$, illustrated in FIG. 6B below, as the robot 102 may evaluate environmental costs 232 proportional to an area overlap between the region 616 and environment objects 604 and 606 and their corresponding decaying risk zones 222 which, as illustrated in FIG. 4B, yields a continuous differentiable overlap area function between zone 616 and objects 604 and 606 as a function of a continuous range of future motion commands $u_p$ (i.e., across a range of θ values). That is, the kernelization of the footprint of the robot 102 yields a region 616 which, in conjunction with sweeping a continuous range future motion commands $u_p$ (i.e., sweeping across a range of θ values), provides sufficient criteria to generate a continuous differentiable overlap area function between region 616 and environmental objects (e.g., objects 606 and 608, risk zones 222, or reward zones), whereas use of a discretized footprint may yield a discretized region 616 and a piecewise non-differentiable overlap area as a function of future motion commands $u_p$. Environmental costs 232, and thereby total costs 316, are a function of the overlap area function which therefore require the overlap area function to be continuous and differentiable such that the total cost 234 is a continuous differentiable function of the future motion commands $u_p$ such that a gradient descent may be performed. The overlap area function being proportional to the environmental costs 232 and thereby total cost 234 functions.

Figure 6B:
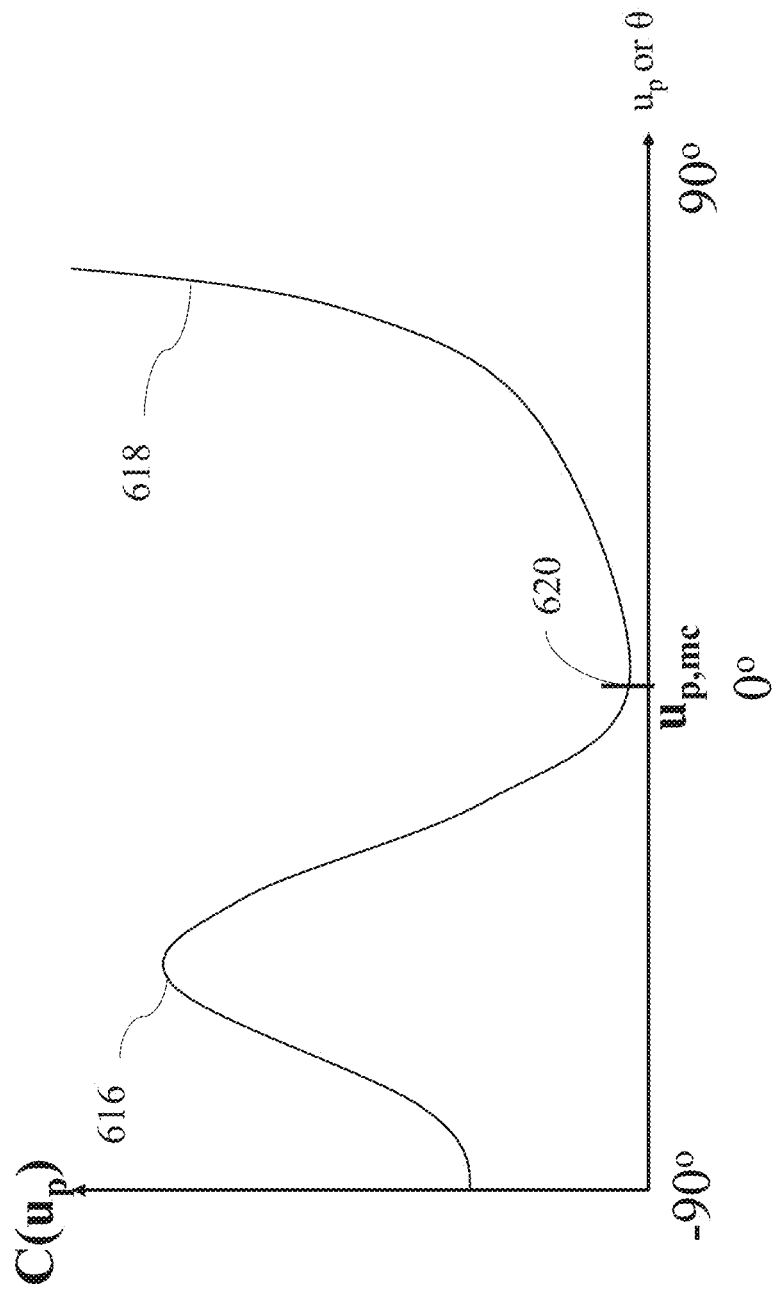
FIG. 6B illustrates a total cost as a function of all available future motion commands generated by the robot illustrated in FIG. 6A above, according to an exemplary embodiment.

FIG. 6B illustrates a cost function $C(u_p)$ as a function of all potential future motion commands $u_p$ available to a robot 102 upon execution of a current motion command $u_{p-1}$, wherein all potential future motion commands comprise a range of steering motions from ±90° as illustrated in FIG. 6A above to be executed at a subsequent time step p, according to an exemplary embodiment. Peak 616 may arise due to object 606, wherein the large cost associated with peak 616 may be due to environmental costs 232 of colliding with the object 606. That is, the large cost may be proportional to an area overlap between a region 616 and the object 606. Point 620 may correspond to a minimum cost as a straight forward movement (i.e., θ=0°) which may comprise minimal control costs 204 and low environmental costs 232 as no objects lie within this path 610. Lastly, peak 618 may arise due to high control costs 204 associated with large steering angles and an additional large environmental cost 232 associated with navigating over object 604. The robot 102 may determine, using gradient descent, that point 620 comprises a global minimum of the cost function $C(u_p)$ corresponding to a minimum cost motion command 242 $u_{p,mc}$ to be executed upon the robot 102 completing its current motion command $u_{p-1}$ and arriving at a location 602 illustrated in FIG. 6A above. The point 620, corresponding to $u_{p,mc}$, may comprise the global minimum as low control costs 204 are associated with straightforward movement (i.e., low rate of change for control and state parameters), negative costs are added for navigating towards a target 614, and low environmental costs 232 due to a lack of objects 604 or 606 along the path 610.

According to at least one non-limiting exemplary embodiment, the cost function illustrated may comprise additional dimensions corresponding to additional state parameters of the robot 102. For example, the cost function may further include a velocity parameter or positional parameters (e.g., x, y), wherein only one parameter θ is illustrated for clarity.

One skilled in the art may appreciate that the systems and methods for determining a minimum cost motion command 242 $u_{p,mc}$ illustrated in FIG. 6A-B may be repeated to determine a sequence of minimum cost motion primitives $u_{0,mc}$, $u_{1,mc}$, $u_{2,mc}$, etc. to effectuate movement of a robot 102 along an entire target trajectory. Additionally, any updates to environment context data (e.g., localization of new objects) which may change environmental costs 232 of a portion of the sequence may configure a controller 118 to update the sequence, or portions of the sequence, in accordance with the update to the environmental context and target trajectory, as further illustrated below in FIG. 7B.

Figure 7A:
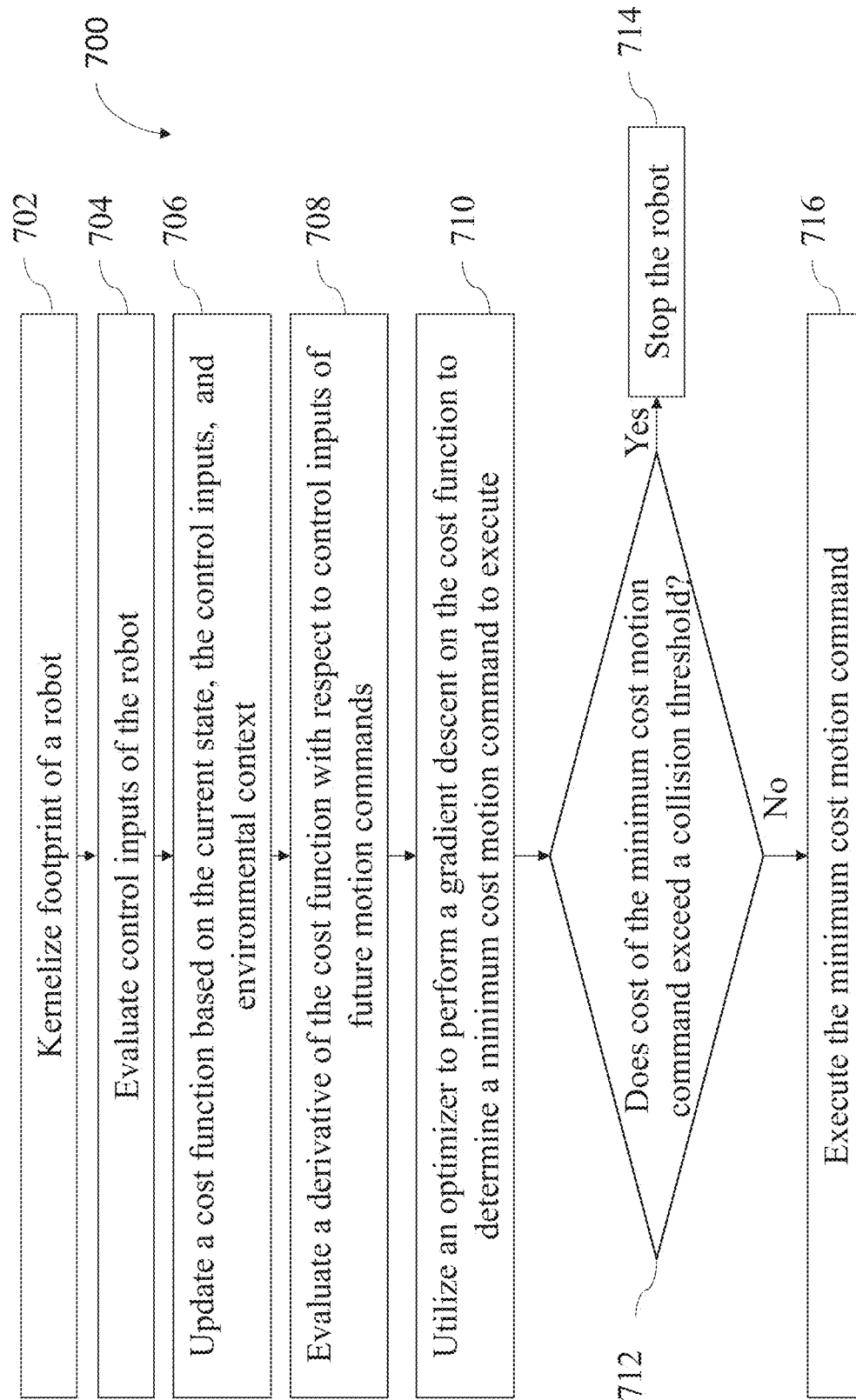
FIG. 7A is a process flow diagram illustrating a method for a controller of a robot to determine a minimum cost motion command, according to an exemplary embodiment.

FIG. 7A is a process flow diagram illustrating a method 700 for a controller 118 of a robot 102 to determine a minimum cost motion command 242 $u_{p,mc}$ to effectuate movement of the robot 102 along a target trajectory, according to an exemplary embodiment. The method 700 illustrated may be utilized to determine the minimum cost motion command 242 $u_{p,mc}$ at a time step p as the robot 102 executes a previous minimum cost motion primitive 242 $u_{p-1,mc}$ determined at a previous time step p-1. Steps of method 700 may be effectuated by the controller 118 of the robot 102 executing computer readable instructions from memory 120.

Block 702 comprises the controller 118 kernelizing a footprint of the robot 102. The kernelized footprint may comprise a continuous and differentiable function which defines a footprint 416 (e.g., two-dimensional outline on a two-dimensional map) of the robot 102. The kernelized footprint may alternatively be precomputed by a separate processor (e.g., from a manufacturer of the robot 102) and communicated to the controller 118 via wired or wireless communication to be stored in memory 120. It is appreciated that this step may be performed prior to operation of the robot 102 if the footprint remains static or during operation of the robot 102.

According to at least one non-limiting exemplary embodiment, a function utilized to kernelize a footprint of a robot 102 may change in time as the robot 102 performs tasks which comprise changing the footprint of the robot 102. For example, the robot 102 may comprise a gripper arm which extends from the robot 102. Accordingly, a current and/or future state of the gripper arm may further be considered when determining the continuous function utilized to kernelize the footprint of the robot 102.

Block 704 illustrates the controller 118 evaluating control inputs 302 to the robot 102. The control inputs 302 may comprise, for example, current and future state parameters of the robot 102. The state parameters may include, but are not limited to, positional and angular orientation of the robot 102 (e.g., (x, y, θ) orientation on in two-dimensional space) and states of any features of the robot 102 (e.g., a gripper arm is extended or retracted). The control inputs 302 may yield a future state of the robot 102 upon execution of the current motion command $u_{p-1,mc}$. The future state parameters may include a future location of the robot 102 upon execution of the current motion command $u_{p-1,mc}$, future states of any features of the robot 102 upon execution of the current motion command $u_{p-1,mc}$, and any additional state data useful for cost evaluation to determine a minimum cost motion command $u_{p,mc}$ to execute subsequent to the current motion command $u_{p-1,mc}$. The controller 118 may utilize a forward model of the robot 102 (i.e., kinematic equations which describe motion of the robot 102 in response to signals to actuator units 108) to determine a state of the robot 102 in response to a control input 302. That is, block 704 includes the use of an MPC pose prediction block illustrated in FIG. 3 above.

Block 706 comprises the controller 118 updating a cost function $C(u_p)$ based on the current state of the robot 102, the control inputs 302, and environmental context. The cost function $C(u_p)$, illustrated in FIG. 6B above, may comprise a total cost function as a function of all future motion commands $u_p$ available to the robot 102 upon completion of the current motion command $u_{p-1,mc}$, wherein the all future motion commands $u_p$ available comprise a continuous range of potentially executable motion commands 202. The cost evaluation may first comprise evaluation of a control cost 204 as a function of the future motion commands $u_p$ available. The cost evaluation may secondly comprise an environmental cost 232 associated with the range of future motion commands $u_p$ based on the current state of the robot 102, a target trajectory or path, and environmental context data collected by sensor units 114, wherein the environmental context data may comprise localized objects within an environment, target objects to navigate towards, hazards to avoid, and/or any other data collected by the sensor units 114. Based on these three costs (i.e., state, control, and environmental costs) the controller 118 may update the cost function $C(u_p)$ to determine a minimum cost motion command 242 $u_{p,mc}$ to execute subsequent to the current motion command $u_{p-1,mc}$.

Block 708 comprises the controller 118 evaluating a derivative of the cost function $C(u_p)$ with respect to control inputs of the future motion commands $u_p$. Advantageously, use of a continuous differentiable function to represent the footprint of the robot 102 (i.e., a kernel) in conjunction with evaluating costs across a continuous range of future motion commands $u_p$ provide sufficient criteria to define a differentiable cost function $C(u_p)$ with respect to the future motion commands $u_p$ such that a gradient descent may be performed to determine a minimum cost motion command 242 $u_{p,mc}$ to execute at time step p.

Block 710 comprises the controller 118 utilizing an optimizer 318 to perform a gradient descent on the cost function $C(u_p)$ to determine a minimum cost motion command $u_{p,mc}$ to execute to effectuate movement of the robot 102. The gradient descent operation is performed by selecting M random precomputed motion commands 202, comprising substantially different motions (e.g., left turn, right turn, etc.), M being a positive integer number, and tracing a slope of the cost function $C(u_p)$ until at least one minimum is determined. Next, the optimizer 318 may evaluate total costs of each minimum of the cost function $C(u_p)$ and select a minimum cost motion command 242 $u_{p,mc}$ corresponding to a motion command of lowest total cost 234.

Block 712 comprises the controller 118 comparing a total cost of the minimum cost motion command 242 $u_{p,mc}$ to a collision threshold. The collision threshold may comprise a static or dynamic total cost value set by, for example, an operator or manufacturer of the robot 102, wherein a minimum cost motion command 242 $u_{p,mc}$ exceeding the collision threshold may correspond to no viable paths being available to the robot 102 without collision with an object or obstacle in the environment as further illustrated below in FIG. 8.

Upon the controller 118 determining the minimum cost motion command 242 exceeds the collision threshold, the controller 118 moves to block 714 to stop the robot 102. The robot 102 may additionally seek for assistance from a human operator using, for example, alarms or wireless communication that in-turn requires further input from the human operator in order to assist or guide the robot 102.

Upon the controller 118 determining the minimum cost motion command 242 comprises a cost below the collision threshold, the controller 118 moves to block 716 to execute the minimum cost motion command 242 $u_{p,mc}$ to effectuate movement of the robot 102.

According to at least one non-limiting exemplary embodiment, any computations described in method 700 may be performed using an external processor external to the robot 102. The external processor may be communicatively coupled to the robot 102 via wired or wireless communications. That is, a controller 118 of the robot 102 may communicate state and environmental data to an external processor and memory (e.g., a cloud server) and receive a minimum cost motion command 242 $u_{p,mc}$ to execute.

One skilled in the art may appreciate that the method 700 may be repeated to generate a sequence of minimum cost motion commands 242 which configure a robot 102 to navigate a target trajectory by sequentially executing the sequence. Advantageously, a robot 102 may plan its entire route by generating the sequence of minimum cost motion commands 242 based on available environmental context data (e.g., localization of objects within an environment). A method 718 described in FIG. 7B below may be utilized to generate and update a sequence of minimum cost motion commands 242.

Figure 7B:
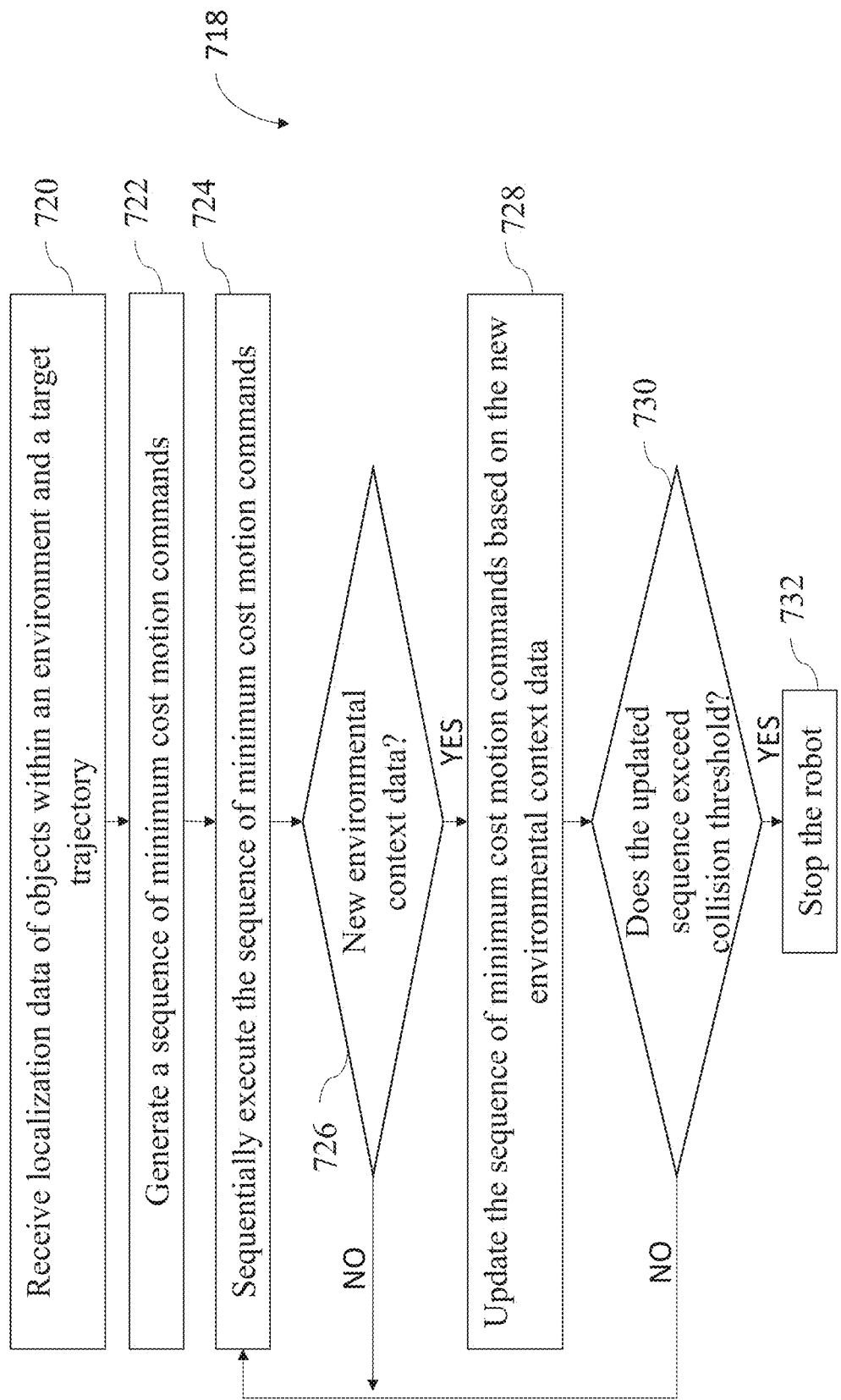
FIG. 7B is a process flow diagram illustrating a method for a controller of a robot to determine a sequence of minimum cost motion commands in accordance with a target trajectory, according to an exemplary embodiment.

FIG. 7B is a process flow diagram illustrating a method 718 for a controller 118 to generate a sequence of minimum cost motion commands for a robot 102 to execute in accordance with a target trajectory, according to an exemplary embodiment. Additionally, the method 718 may further comprise determining updates to the sequence to account for changes in environmental context data detected by one or more sensor units 114. Steps of method 718 may be effectuated by the controller 118 executing computer readable instructions from a memory 120.

Block 720 illustrates the controller 118 receiving localization data of objects within an environment and a target trajectory. The localization data of the objects may be generated, for example, during prior navigation through the environment or by an operator. The controller 118 may receive the localization data prior to navigation of the target trajectory, wherein the localization data may comprise localization of all, some, or no objects within an environment. Additionally, the controller 118 may receive a target trajectory comprising a route to follow, a target location to navigate to, a task to complete, and so forth.

Block 722 illustrates the controller 118 generating a sequence of minimum cost motion commands 242 (e.g., $u_{0,mc}, u_{1,mc}, \ldots u_{p,mc}$). The controller 118 may generate the sequence by iterating method 700 to determine minimum cost motion commands 242 for each time step along the target trajectory based on the localization data of objects within the environment. The sequence of minimum cost motion commands 242 may comprise a series of sequential motion commands, determined to be optimal motions based on minimizing a total cost 234 for each motion command, for the controller 118 to execute to effectuate continuous motion of the robot 102 along the target trajectory.

Block 724 illustrates the controller 118 sequentially executing the sequence of minimum cost motion commands 242. The controller 118 may begin by executing a first minimum cost motion command 242 $u_{0,mc}$ and sequentially executing minimum cost motion commands of the sequence until the robot 102 has navigated the target trajectory. During execution of motion commands within the sequence, the robot may utilize sensor units 114 to collect environmental context data which may comprise localization of previously undetected objects within the environment.

Block 726 comprises the controller 118 determining if new environmental context data is detected. The new environmental context data may include, for example, localization of new objects, unforeseen hazards to avoid, dynamic objects (e.g., humans or other robots), any changes in the environment, and/or any new data which may configure a controller 118 to update the sequence of minimum cost motion commands 242 responsive to its environment (i.e., to minimize cost). According to at least one non-limiting exemplary embodiment, a robot 102 may comprise a computer readable map of its environment stored in a memory 120, wherein substantial deviation of detected objects from the computer readable map may cause the robot 102 to update the sequence of minimum cost motion commands 242 based on the deviation.

Upon the controller 118 determining no new environmental context data has been detected, the controller 118 returns to block 724 to continue executing the sequence of minimum cost motion commands 242.

Upon the controller 118 determining new environmental context data has been detected, the controller 118 moves to block 728.

According to at least one non-limiting exemplary embodiment, the controller 118 may always determine that new environmental context data is present and may therefore skip the determination in block 726 and proceed to block 728. In some embodiments, new environmental context data may always be present using egocentric coordinates centered about an origin 424 of the robot 102 due to relative motion of objects in the environment.

Block 728 illustrates the controller 118 updating the sequence of minimum cost motion commands 242 based on the new environmental context data. The controller 118 may update some or all subsequent motion commands of the sequence based on the new environmental context data. For example, a robot 102 navigating a target trajectory may detect a new object along the target trajectory, wherein a current sequence of minimum cost motion commands may comprise the robot 102 navigating over the new object. The controller 118 may, in this example, update a portion of the sequence to configure the robot 102 to navigate around the new object and return to the target trajectory by updating some motion commands of the sequence based on minimizing a total cost 234. Many subsequent motion commands of the sequence may remain unchanged or comprise substantially little change, as further illustrated below in FIG. 8A.

Block 730 illustrates the controller 118 determining if any minimum cost motion commands 242 of the updated sequence comprise a cost exceeding a collision threshold. This threshold may be imposed to ensure the updated sequence effectuates safe movement of the robot 102.

Upon the controller 118 determining the updated sequence comprises minimum cost motion commands 242 which exceed the collision threshold, the controller 118 moves to block 732 to stop the robot 102. In some instances, the robot 102 may call for human assistance via a wireless signal to a device (e.g., a phone of an operator), an audio signal (e.g., a beep), a visual signal (e.g., flashing a light), and/or any other means for communicating a need for assistance from a human.

Upon the controller 118 determining the updated sequence comprises no minimum cost motion commands 242 exceeding the collision threshold, the controller 118 returns to block 724 to continue sequentially executing the sequence of minimum cost motion commands 242.

Advantageously, the method 718 may enable a robot 102 to plan its movement along a target trajectory prior to navigation using a sequence of minimum cost motion commands 242. Additionally, the method 718 further enhances an ability of the robot 102 to adapt to changes in its environment by updating the sequence based on new environmental context data. One skilled in the art may appreciate that a robot 102 may detect new environmental context data, such as new objects within an environment, many time steps prior to a time wherein the robot 102 must react to the new environmental context data. Accordingly, the method 718 may enable robots 102 to determine updates to the sequence at least one time step in advance thereby enhancing the ability of the robot 102 to adapt to the changes in the environment by improving future movement planning capabilities of the robot 102.

FIG. 8A illustrates a robot 102 navigating towards a target 804 along a target trajectory 806 using the methods illustrated in FIG. 7A-B above, according to an exemplary embodiment. First, at time step 0, the robot 102 may plan a sequence of minimum cost motion commands 242 $u_{0,mc}$, $u_{1,mc}$, ... $u_{6,mc}$ to effectuate movement of the robot 102 towards the target 804. The shaded region of trajectory 806 illustrated may be determined by an MPC pose prediction block 306 based on a region occupied by a footprint of the robot 102 as it navigates towards the target 804 based on the sequence of minimum cost motion commands. The shaded region of the trajectory 806 may further comprise a minimum travel distance for the robot 102 to arrive at the target 804. The MPC pose prediction block 306 may additionally determine locations of footprints 802 corresponding to locations of the robot 102 upon executing corresponding minimum cost motion commands 242 $u_{p,mc}$. In some embodiments, the region 806 may correspond to a route which was taught to the robot 102.

Next, at time step 1, the robot 102 may detect an object 808 along the target trajectory 806 not localized at time step 0 using measurement beams 810 from, for example, a LiDAR sensor, RGB camera, depth camera, or any other exteroceptive sensor unit 114. A controller 118 of the robot 102 may calculate updates to the sequence of minimum cost motion commands 242 during execution of its current motion command $u_{1,mc}$, in accordance with method 718 illustrated above in FIG. 7B. It is appreciated that the robot 102 may alternatively detect the object 808 during execution of the previous motion command $u_{0,mc}$.

Lastly, at time step 2, the robot 102 arrives at its illustrated position upon completion of the motion command $u_{1,mc}$ and may sequentially execute a series of updated minimum cost motion commands $u'_{p,mc}$ based on the detection of object 808 during the previous time step. The updated sequence may comprise the robot 102 moving along a curved motion around the object 808 by executing the updated motion commands $u'_{2,mc}$ through $u'_{5,mc}$. Additionally, $u_{6,mc}$ may comprise substantially little change due to the object 808 as a previous motion command $u'_{5,mc}$ comprises the robot 102 navigating back to the target trajectory 806 at a location substantially similar to a determined location illustrated at time step 0 when the object 808 was not detected.

As illustrated in FIG. 8A, the methods 700 and 718 may enable a robot 102 to calculate updates to a sequence of minimum cost motion commands 242 based on new environmental context data, such as localization of object 808, in advance. That is, the robot 102 may make real time updates to its sequence of minimum cost motion commands 242 to ensure safety of the robot 102 (i.e., no collisions), smooth movement through an environment, and optimal motion towards a target 804. One skilled in the art may appreciate that shortening a time step between sequential minimum cost motion commands 242 may further enhance an ability of a robot 102 to react to sudden changes in its environment. Ideally, the time step may be configured to be as short as possible and the number of motion commands calculated ahead of time may be as large as possible given computing resources available to the controller 118 to plan a trajectory of a robot 102.

Figure 8B:
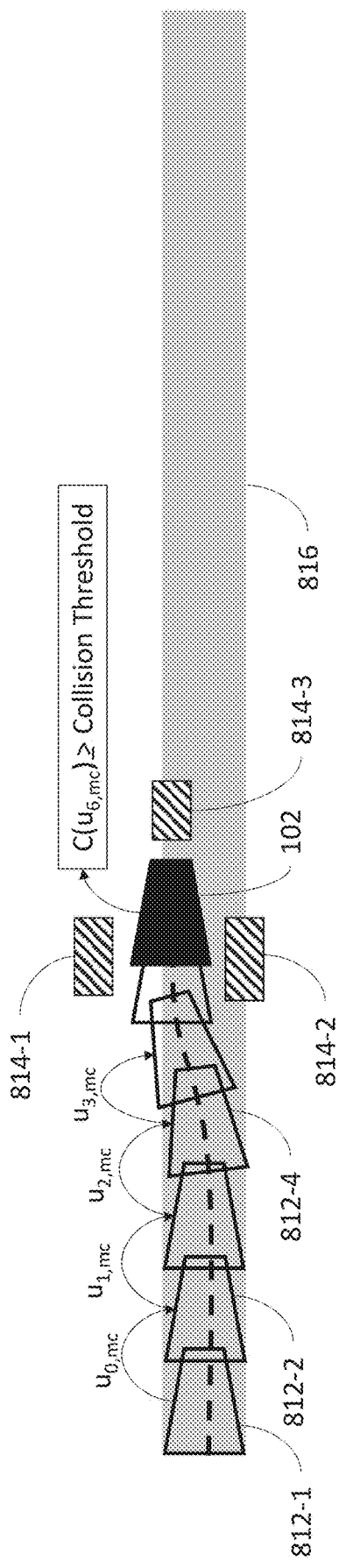
FIG. 8B illustrates a robot navigating along a trajectory comprising multiple objects causing a minimum cost motion command to exceed a prescribed collision threshold, according to an exemplary embodiment.

FIG. 8B illustrates a robot 102 navigating within a region 816 around objects 814, according to an exemplary embodiment. Each footprint 812 (812-1, 812-2, 812-3, 812-4) illustrated may represent a time step wherein the robot 102 follows method 718 to determine a sequence of motion commands to execute or updates to the sequence. The robot 102 may start at a location of footprint 812-1 and may subsequently move along a route defined by the region 816 by executing a minimum cost motion command $u_{0,mc}$ to arrive at a location of footprint 812-2, executing a subsequent motion command $u_{1,mc}$ to arrive at a location of footprint 812-3, and so forth, wherein some motion commands have not been explicitly illustrated for clarity. The robot 102 may be equipped with light detection and ranging (LiDAR) sensors, wherein the robot 102 may only detect obstacles 814-1 and 814-2 upon navigating nearby the obstacles. Accordingly, at a location of footprint 812-4 the robot 102 may determine to navigate between obstacles 814-1 and 814-2 based on an associated total cost 234 of navigating between the obstacles 814-1 and 814-2 being a minimum. The robot 102, however, may not detect obstacle 814-3 until the robot 102 is at or near the illustrated location. The robot 102 may still determine a minimum cost motion command 242 $u_{6,mc}$ to execute from its position illustrated, however a cost associated with this motion command $u_{6,mc}$ (i.e., $C(u_{6,mc})$) may meet or exceed a collision threshold, illustrated above in FIG. 7A-B, due to a high environment cost 232 associated with colliding with the surrounding obstacles 814.

According to at least one non-limiting exemplary embodiment, a robot 102, upon determining no motion commands fall below a collision threshold, the robot 102 may call for assistance from a human. According to at least one non-limiting exemplary embodiment, a robot 102 may execute a minimum cost motion command 242 $u_{6,mc}$ at its location illustrated to cause the robot 102 to navigate backwards (e.g., backtrack to prior locations of footprints 802). It is appreciated however that backwards navigation may be impossible for some robots 102 or may be unsafe.

One skilled in the art would appreciate that the routes illustrated in FIG. 8A-B, defined by reward regions 806 or 816 for a robot 102 to follow, may additionally comprise a plurality of turns, wherein the straight routes illustrated in FIG. 8A-B are not intended to be limiting.

Advantageously, a robot 102 constantly recalculates its cost function, and hence future motion command to execute based on minimizing cost, may enhance the navigation capabilities of a robot 102 by enabling a controller 118 to constantly recalculate an optimal trajectory every $t_1$ seconds, wherein the duration of $t_1$ seconds may be based on a time to determine a minimum cost motion command 242 or a fixed time duration of a motion command. Constantly recalculating a total cost function may further enhance the ability of the robot 102 to respond to changes in its environment such as nearby moving obstacles (e.g., people) as the robot 102 may update its cost function in real time and hence update an optimal minimum cost motion command 242 $u_{p,mc}$.

Figure 9:
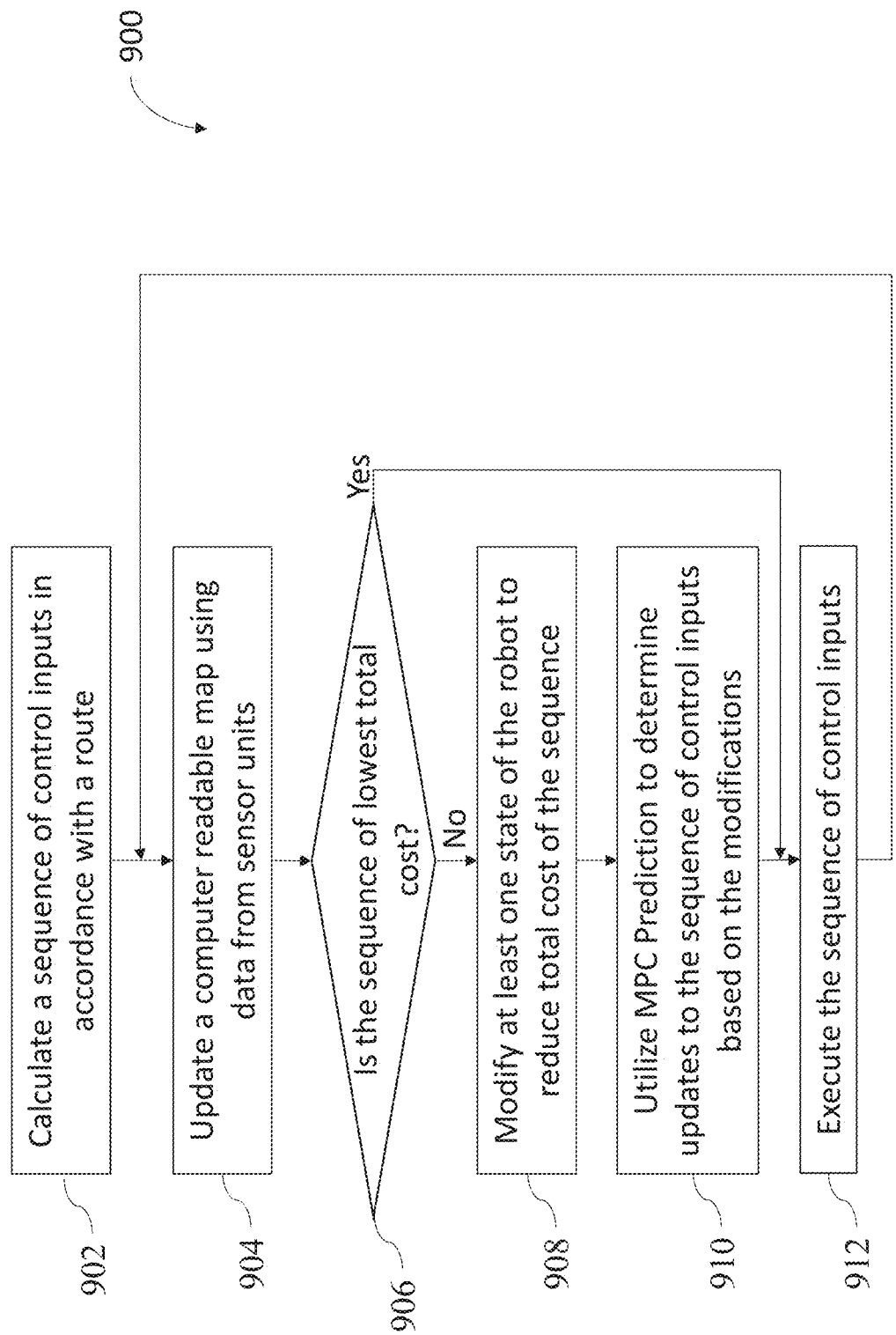
FIG. 9 is a process flow diagram illustrating a method for a controller of a robot to find and execute a minimum cost motion command, according to an exemplary embodiment.

FIG. 9 is a process flow diagram illustrating a method 900 for a controller 118 of a robot 102 to plan its trajectory in accordance with the teachings of the present disclosure, according to an exemplary embodiment. Steps of method 900 may be effectuated by the controller 118 executing computer readable instructions stored in memory 120.

Block 902 comprises of the controller 118 calculating a sequence of control inputs 302 in accordance with a route. The route may be represented by a computer readable map. The robot 102 may be at the start of the route, wherein the controller 118 may calculate the sequence to configure the robot 102 to follow the route and avoid obstacles localized on the computer readable map. The sequence may include one or more motion commands 208 or control inputs 302 for the robot 102 to execute in sequence to follow the route. For example, the sequence may include N-motion commands or control inputs 302 [$(v_1, \omega_1), (v_2, \omega_2), (v_N, \omega_N)$], wherein v may represent translational velocity and w may represent a turning rate. Upon executing each control input 302, the robot 102 may be at a state point. The state points being locations of the robot 102 upon completion of a preceding control input 302 ($v_{n-1}, \omega_{n-1}$) and just prior to execution of a succeeding control input 302 ($v_n, \omega_n$) (e.g., locations of circles 418-1, 418-2, 418-3 of FIG. 4E(i) denote three state points upon execution of control inputs 432-1, 432-2).

Block 904 comprises of the controller 118 updating a computer readable map using data from one or more exteroceptive sensor units 114. Updating of the computer readable map may include localizing one or more sensed objects onto the map. Updating the computer readable map may further include calculating and localizing a position of the robot 102 within its environment.

Block 906 comprises of the controller 118 determining if the sequence is of lowest total cost 234. The sequence may be of lowest total cost if (i) the sequence of control inputs 302 corresponds to a global minimum of a cost function 502, or (ii) translations of state points of the route do not reduce costs. For example, as shown in FIG. 4E-F, translating a state point shown by a center 420 of circle 418-2 in FIG. 4E(i) by +y reduces overlap with an object 436, thereby reducing an environmental cost 232 which is a part of the total cost function 502. As another example, as shown in FIG. 4E(ii), translating the center 420 of circle 418-2 may not yield any decrease in cost for translations in any direction and may further increase control cost 204 due to increasing a deviation from the assigned route shown by 432-1 and 432-2. In some embodiments, increased cost due to deviation from the assigned route may be embodied within environmental costs (i.e., cost matrix 430). In some instances, sensor units 114 may detect an object in block 904 not previously sensed, e.g., as shown in FIG. 8A, wherein the total cost may change upon the controller 118 updating the computer readable map using data from sensor units 114.

Upon the controller 118 determining the sequence of control inputs 302 is not of lowest total cost 234, the controller 118 proceeds to block 908.

Upon the controller 118 determining the sequence of control inputs 302 is of lowest total cost 234, the controller 118 may move to block 912 and execute the sequence of control inputs 302.

In some embodiments, block 906 may further include comparing the total cost 234 with a collision threshold. For example, as shown in FIG. 8B, the control inputs 302 may be of minimum total cost 234 however the minimum may exceed the collision threshold corresponding to the robot 102 colliding with an object. Accordingly, the controller 118 may attempt to modify the control inputs 302 to configure the total cost 234 to be below the collision threshold following the steps illustrated in blocks 908-912 below.

Block 908 comprises of the controller 118 modifying at least one state of the robot 102 to reduce total cost 234 of the sequence of control inputs 302. The at least one state may include one or more state points, or points where the robot 102 has executed a preceding control input 302 ($v_n$, $\omega_n$) and is about to execute a succeeding control input 302 ($v_{n+1}$, $\omega_{n+1}$) defined by (x, y, θ) parameters (or additional (z, yaw, roll) parameters for robots 102 operating in 3D). As shown in FIG. 4A-F, the environmental cost 232 may be defined as a continuous differentiable function of the robot 102 position. As shown in FIG. 4F(i-ii), a controller 118 may perform a gradient descent to determine if changes to the (x, y) position of a kernelized footprint of the robot 102 (i.e., circle 418-2) reduces environmental cost 234. This may be performed for each state point of the sequence of control inputs 302.

By way of illustration and with reference to FIG. 8A, the controller 118 may determine that the state point (shown by footprints 802) of robot 102 upon executing $u_{3,mc}$ may be modified along ±y to reduce environmental cost 232. Accordingly, the state point may be modified to include the robot 102 navigating above the object 808. Without modifying the preceding or succeeding state points (shown by footprints 802), large control costs 204 may be associated with the modification due to a sudden change in direction of the robot 102. The large increase in control costs 204 may counteract the reduction on environmental costs 234. Accordingly, one or more preceding and succeeding state points may be modified to configure smooth motion of the robot 102 around the object 808, as shown by modifications to $u'_{2,mc}$ through $u'_{5,mc}$.

Returning to FIG. 9, block 910 comprises the controller 118 utilizing an MPC pose prediction block 306 to determine updates to the sequence of control inputs 302 based on the modifications performed in block 908. The MPC pose prediction block 306 may be configured to predict a pose of the robot 102 upon execution of a control input 302 or perform the inverse (i.e., calculate a control input 302 to configure the robot 102 to move from a first state to a second state) using kinematic equations which describe motion and position of the robot 102. Accordingly, the MPC prediction block 306 may determine any updates to the sequence of control inputs 302 which configure the motion of the robot 102 in accordance with any state points modified in block 908 above.

By way of illustration, with reference to FIG. 8A, the MPC pose prediction block 308 may determine that $u_{3,mc}$ should be modified to include the state point (i.e., footprint 802) which moves the robot 102 above the object 808. Additionally, the subsequent control input $u_{4,mc}$ may be modified as well. The controller 118 may determine that a high control are associated with only modifying control inputs $u_{3,mc}$ and $u_{4,mc}$. Accordingly, the controller 118 may modify the preceding and succeeding state points, wherein the MPC pose prediction block 306 may calculate modifications to $u_{2,mc}$ up to $u_{5,mc}$ in accordance with minimizing total cost 234 for executing the sequence of control inputs 302.

Block 912 comprises of the controller 118 executing the sequence of control inputs 302. Execution of the sequence may configure the robot 102 to follow a route. During each time step (i.e., during execution of a control input $u_{p,mc}$ at time step p), the controller 118 may return to block 904 and evaluate the remaining sequence of control inputs 302. That is, controller 118 may execute at least one of the control inputs prior to returning to block 904. In doing so, the controller 118 may consistently modify the trajectory of the robot 102 in real time in accordance with new data from sensor units 114 and the route the robot 102 is to follow.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, un-recited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method for navigating a robotic device along a target trajectory, comprising:
   evaluating a current state of the robotic device and environmental context using at least one sensor, the at least one sensor coupled to the robotic device;
   evaluating a total cost function as a function of all available motion commands based on the current state and the environmental context, the total cost being a summation of an environmental cost and a control cost for the all available motion commands;
   performing a gradient descent beginning with at least one initial value on the total cost function to evaluate at least one minima in the total cost function, wherein each of the at least one initial value comprises a motion command;
   determining a minimum cost motion command based on the total cost function and the lowest total cost of the at least one initial value; and
   executing the minimum cost motion command to effectuate movement of the robotic device along the target trajectory.

2. The method of claim 1, further comprising:
   generating a kernelized footprint of the robotic device using at least one continuous and differentiable function; and
   utilizing the kernelized footprint to generate a continuous differentiable environmental cost as a function of the all available motion commands based on an area overlap between the kernelized footprint and environmental objects projected on a computer readable map during simulated execution of the all available motion commands.

3. The method of claim 1,
   wherein each of the at least one motion commands of the initial value is randomly selected.

4. The method of claim 1, further comprising:
   imposing a collision threshold on a cost of the minimum cost motion command, wherein the cost of a minimum cost motion command either meets or exceeds the collision threshold, the collision threshold corresponds to no viable motion commands being available to the robotic device without collision with objects of the environment.

5. The method of claim 1, further comprising:
   evaluating the minimum cost motion command during execution of a current motion command, the current motion command being determined to comprise a minimum cost motion command during a previous time step,
   wherein the all available motion commands comprise a continuous range of motion commands executable from a position of the robotic device upon completion of the current motion command.

6. The method of claim 1, further comprising:
   utilizing a forward model of the robotic device to determine a sequence of minimum cost motion commands for a sequence of time steps, the sequence of motion commands configure the robotic device to maneuver in accordance with the target trajectory.

7. The method of claim 6, further comprising:
   updating at least a portion of the sequence of minimum cost motion commands based on new environmental context data detected by at least one sensor of the robotic device.

8. A robotic device comprising:
   a non-transitory computer readable storage medium comprising a plurality of computer readable instructions stored thereon;
   at least one controller configured to execute the computer readable instructions to:
     evaluate a current state of the robotic device and environmental context using at least one sensor coupled to the robotic device;
     evaluate a total cost function as a function of all available motion commands based on the current state and the environmental context, the total cost being a summation of a control cost and an environmental cost for the all available motion commands;
     perform a gradient descent beginning with at least one initial value on the total cost function to evaluate at least one minima in the total cost function, wherein each of the at least one initial value comprises a motion command;
     determine a minimum cost motion command based on the total cost function and the lowest total cost of the at least one initial value; and
     execute the minimum cost motion command to effectuate movement of the robotic device along a target trajectory.

9. The robotic device of claim 8, wherein the at least one controller is further configured to execute the computer readable instructions to:
   generate a kernelized footprint of the robotic device using at least one continuous and differentiable function; and
   utilize the kernelized footprint to generate a continuous differentiable environmental cost as a function of the all available motion commands based on an area overlap between the kernelized footprint and environmental objects projected on a computer readable map during simulated execution of the all available motion commands.

10. The robotic device of claim 8, wherein the
    at least one motion command is randomly selected as the initial value.

11. The robotic device of claim 8, wherein the at least one controller is further configured to execute the computer readable instructions to:

impose a collision threshold on a cost of the minimum cost motion command, wherein a cost of a minimum cost motion command either meets or exceeds the collision threshold, the collision threshold corresponds to no viable motion commands being available to the robotic device without collision with objects of the environment.

12. The robotic device of claim 8, wherein the at least one controller is further configured to execute the computer readable instructions to:

evaluate the minimum cost motion command during execution of a current motion command, the current motion command being determined to comprise a minimum cost motion command during a previous time step and the minimum cost motion command is executed subsequent to the current motion command, and wherein the all available motion commands comprise a continuous range of motion commands executable from a position of the robotic device upon completion of the current motion command.

13. The robotic device of claim 8, wherein the at least one controller is further configured to execute the computer readable instructions to:

utilize a forward model of the robotic device to determine a sequence of minimum cost motion commands for a sequence of time steps, the sequence of motion commands configure the robot device to maneuver in accordance with the target trajectory.

14. The robotic device of claim 13, wherein the at least one controller is further configured to execute the computer readable instructions to:

update at least a portion of the sequence of minimum cost motion commands based on new environmental context data detected by at least one sensor of the robotic device.

15. A method for navigating a robotic device along a target trajectory, comprising:

evaluating a current state of the robotic device and environmental context using at least one sensor, the at least one sensor being coupled to the robotic device;

generating a kernelized footprint of the robotic device using at least one continuous and differentiable function;

utilizing the kernelized footprint to generate a continuous differentiable environmental cost as a function of all available motion commands based on an area overlap between the kernelized footprint and environmental objects projected on a computer readable map during simulated execution of the all available motion commands;

evaluating a total cost function, the total cost being a summation of the environmental cost and a control cost for the all available motion commands;

utilizing at least one randomly selected motion command as at least one initial value on the total cost function;

performing a gradient descent beginning at each of the at least one initial values to evaluate at least one minima in the total cost function;

selecting the minimum cost motion command based on the lowest total cost of the at least on minima;

imposing a collision threshold on a cost of the minimum cost motion command, the minimum cost motion command exceeding the collision threshold corresponds to no viable motion commands being available to the robotic device without collision with objects of the environment; and executing the minimum cost motion command to effectuate movement of the robotic device along the target trajectory if the minimum cost motion command comprises a total cost below the collision threshold.

16. A method for navigating a robotic device along a target trajectory, comprising:

evaluating a current state of the robotic device and environmental context using at least one sensor, the at least one sensor being coupled to the robotic device;

generating a kernelized footprint of the robotic device using at least one continuous and differentiable function;

utilizing the kernelized footprint to generate a continuous differentiable environmental cost as a function of all available motion commands based on an area overlap between the kernelized footprint and environmental objects projected on a computer readable map during simulated execution of the all available motion commands;

evaluating a total cost function as a function of all available motion commands based on the current state and the environmental context, the total cost being a summation of an environmental cost and a control cost for the all available motion commands;

determining a minimum cost motion command based on the total cost function; and executing the minimum cost motion command to effectuate movement of the robotic device along the target trajectory.

17. A robotic device comprising:

a non-transitory computer readable storage medium comprising a plurality of computer readable instructions stored thereon;

at least one controller configured to execute the computer readable instructions to:

evaluate a current state of the robotic device and environmental context using at least one sensor coupled to the robotic device;

generate a kernelized footprint of the robotic device using at least one continuous and differentiable function;

utilize the kernelized footprint to generate a continuous differentiable environmental cost as a function of the all available motion commands based on an area overlap between the kernelized footprint and environmental objects projected on a computer readable map during simulated execution of the all available motion commands;

evaluate a total cost function as a function of all available motion commands based on the current state and the environmental context, the total cost being a summation of a control cost and an environmental cost for the all available motion commands;

determine a minimum cost motion command based on the total cost function; and execute the minimum cost motion command to effectuate movement of the robotic device along a target trajectory.

18. The method of claim 16, further comprising:

imposing a collision threshold on a cost of the minimum cost motion command, wherein the cost of a minimum cost motion command either meets or exceeds the collision threshold, the collision threshold corresponds to no viable motion commands being available to the robotic device without collision with objects of the environment.

19. The method of claim 16, further comprising:

evaluating the minimum cost motion command during execution of a current motion command, the current motion command being determined to comprise a minimum cost motion command during a previous time step, wherein the all available motion commands comprise a continuous range of motion commands executable from a position of the robotic device upon completion of the current motion command.

20. The robotic device of claim 17, wherein the at least one controller is further configured to execute the computer readable instructions to:

impose a collision threshold on a cost of the minimum cost motion command, wherein the cost of a minimum cost motion command either meets or exceeds the collision threshold, the collision threshold corresponds to no viable motion commands being available to the robotic device without collision with objects of the environment.

\* \* \* \* \*